US012666289B2

(12) United States Patent
Lei et al.

(10) Patent No.: US 12,666,289 B2
(45) Date of Patent: Jun. 23, 2026

(54) PAIRING OF SYNCHRONIZATION SIGNALS FOR TRACKING AND MEASUREMENT

(71) Applicant: QUALCOMM Incorporated, San Diego, CA (US)

(72) Inventors: Jing Lei, San Diego, CA (US); Jing Jiang, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/363,410

(22) Filed: Aug. 1, 2023

(65) Prior Publication Data

US 2024/0049016 A1 Feb. 8, 2024

Related U.S. Application Data

(60) Provisional application No. 63/370,302, filed on Aug. 3, 2022.

(51) Int. Cl.
| | |
|---|---|
| *H04W 24/08* | (2009.01) |
| *H04L 5/00* | (2006.01) |
| *H04W 16/14* | (2009.01) |
| *H04W 48/08* | (2009.01) |

(52) U.S. Cl.
CPC ........... *H04W 24/08* (2013.01); *H04L 5/0091* (2013.01); *H04W 16/14* (2013.01); *H04W 48/08* (2013.01)

(58) Field of Classification Search
CPC ..... H04W 24/08; H04W 16/14; H04W 48/08; H04L 5/0091
See application file for complete search history.

(56) References Cited

U.S. PATENT DOCUMENTS

| | | | | |
|---|---|---|---|---|
| 2017/0353254 A1* | 12/2017 | Islam | .................... | H04L 5/0023 |
| 2019/0394747 A1* | 12/2019 | Akkarakaran | ........ | H04L 5/0007 |
| 2020/0022010 A1* | 1/2020 | Kim | ...................... | H04W 24/02 |
| 2023/0060894 A1* | 3/2023 | Rastegardoost | ..... | H04B 7/0695 |

(Continued)

FOREIGN PATENT DOCUMENTS

| | | |
|---|---|---|
| WO | WO-2020063308 A1 | 4/2020 |
| WO | WO-2022031988 A1 | 2/2022 |

OTHER PUBLICATIONS

International Search Report and Written Opinion—PCT/US2023/071527—ISA/EPO—Nov. 24, 2023.

(Continued)

*Primary Examiner* — Michael Thier
*Assistant Examiner* — Tracy Lauren Raimondo
(74) *Attorney, Agent, or Firm* — Paul M. McAdams; NORTON ROSE FULBRIGHT US LLP

(57) ABSTRACT

This disclosure provides systems, methods, and devices for wireless communication that support synchronization signal pairing. In a first aspect, a first network node includes a memory and at least one processor coupled to the memory, wherein the at least one processor is configured to: receive, from a second network node, an indication of a first quantity of beams, receive, from the second network node, bitmap information including a first bitmap for a first beam of the first quantity of beams and a second bitmap for a second beam of the first quantity of beams, and generate first measurement information based on the bitmap information. Other aspects and features are also claimed and described.

13 Claims, 14 Drawing Sheets

(56) References Cited

U.S. PATENT DOCUMENTS

| | | | | |
|---|---|---|---|---|
| 2023/0138567 | A1* | 5/2023 | Gao | H04B 7/0413 |
| | | | | 370/329 |
| 2023/0319747 | A1* | 10/2023 | Goyal | H04W 68/02 |
| | | | | 370/503 |
| 2023/0370966 | A1* | 11/2023 | Dhanani | H04W 48/20 |
| 2024/0147447 | A1* | 5/2024 | Wu | H04L 5/16 |

OTHER PUBLICATIONS

Spreadtrum Communications: "Discussion on Initial Access and Mobility in NR-U", 3GPP TSG RAN WG1 Meeting #98bis, R1-1910015, 3rd Generation Partnership Project, Mobile Competence Centre, 650, Route Des Lucioles, F-06921 Sophia-Antipolis, vol. RAN WG1, No. Chongqing, China, Oct. 14, 2019-Oct. 20, 2019, Oct. 3, 2019, 15 Pages, XP051808046, Section 2.3.2, p. 10, Figure 1, p. 3.

* cited by examiner

500

| SSB Block Index | 0 | 1 | 2 | 3 | 4 | 5 | 6 | 7 |
|---|---|---|---|---|---|---|---|---|
| Bitmap | 1 | 1 | 1 | 1 | 1 | 1 | 0 | 0 |

| SSB Block Index | 0 | 1 | 2 | 3 | 4 | 5 | 6 | 7 |
|---|---|---|---|---|---|---|---|---|
| Bitmap 1 | 1 | 0 | 0 | 1 | 0 | 0 | 0 | 0 |
| Bitmap 2 | 0 | 1 | 0 | 0 | 1 | 0 | 0 | 0 |
| Bitmap 3 | 0 | 0 | 1 | 0 | 0 | 1 | 0 | 0 |

| SSB Block Index | 0 | 1 | 2 | 3 | 4 | 5 | 6 | 7 |
|---|---|---|---|---|---|---|---|---|
| Bitmap 1 | 1 | 1 | 0 | 0 | 0 | 0 | 0 | 0 |
| Bitmap 2 | 0 | 0 | 1 | 1 | 0 | 0 | 0 | 0 |
| Bitmap 3 | 0 | 0 | 0 | 0 | 1 | 1 | 0 | 0 |

| SSB Block Index | 0 | 1 | 2 | 3 | 4 | 5 | 6 | 7 |
|---|---|---|---|---|---|---|---|---|
| Bitmap 1 | 1 | 0 | 0 | 1 | 0 | 0 | 0 | 0 |
| Bitmap 2 | 0 | 1 | 0 | 0 | 1 | 0 | 0 | 0 |

| SSB Block Index | 0 | 1 | 2 | 3 | 4 | 5 | 6 | 7 |
|---|---|---|---|---|---|---|---|---|
| Bitmap 1 | 1 | 1 | 0 | 0 | 0 | 0 | 0 | 0 |
| Bitmap 2 | 1 | 1 | 1 | 1 | 0 | 0 | 0 | 0 |
| Bitmap 3 | 0 | 0 | 0 | 0 | 1 | 1 | 0 | 0 |

| SSB Block Index | 0 | 1 | 2 | 3 | 4 | 5 | 6 | 7 |
|---|---|---|---|---|---|---|---|---|
| Bitmap 1 | 1 | 0 | 1 | 0 | 1 | 0 | 0 | 0 |
| Bitmap 2 | 1 | 1 | 1 | 0 | 0 | 0 | 0 | 0 |
| Bitmap 3 | 0 | 0 | 0 | 0 | 1 | 1 | 0 | 0 |

*FIG. 5F*

SSBs Associated with First Beam

SSBs Associated with Second Beam

SSBs Associated with Third Beam

| SSB Block Index | 0 | 1 | 2 | 3 |
| --- | --- | --- | --- | --- |
| Bitmap 1 | 1 | 0 | 0 | 0 |
| Bitmap 2 | 0 | 1 | 0 | 0 |
| Bitmap 3 | 0 | 0 | 1 | 0 |

700

| SSB Block Index | 0 | 1 |
| --- | --- | --- |
| Bitmap 1 | 1 | 0 |
| Bitmap 2 | 0 | 1 |

710

| SSB Block Index | 0 | 1 | 2 | 3 |
| --- | --- | --- | --- | --- |
| Bitmap 1 | 1 | 0 | 0 | 0 |
| Bitmap 3 | 0 | 0 | 1 | 0 |

720

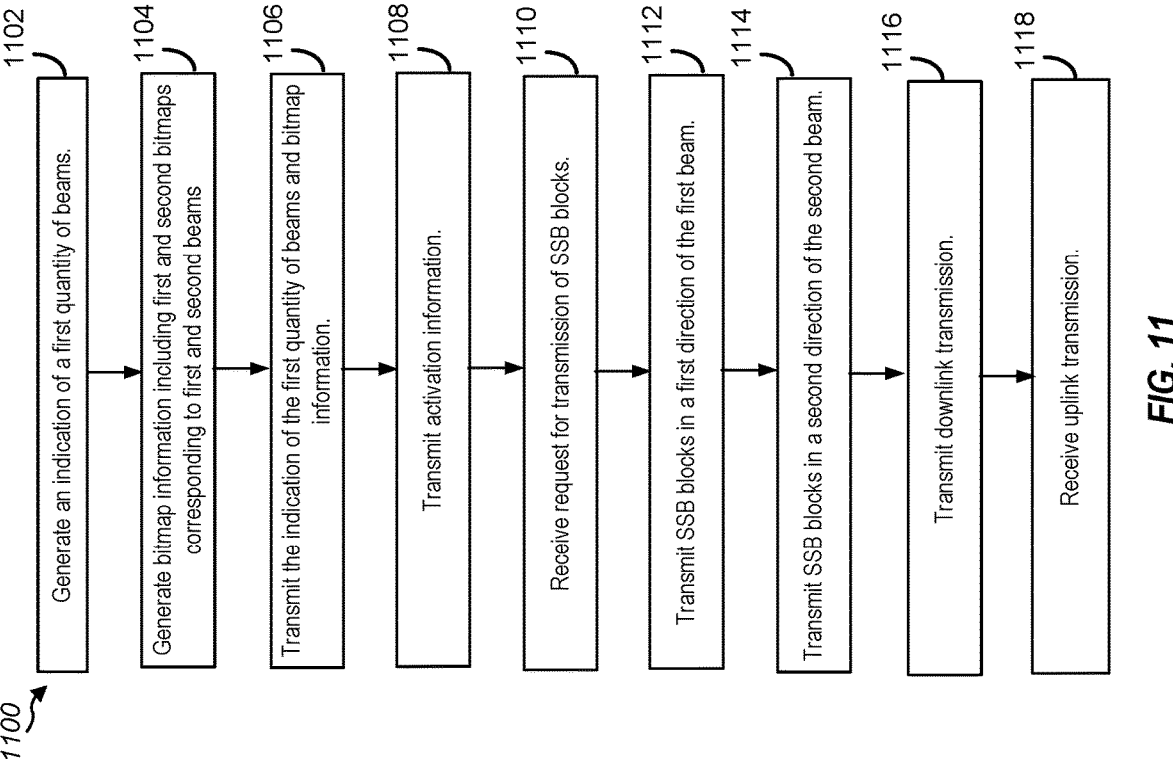

1100

1102 Generate an indication of a first quantity of beams.

1104 Generate bitmap information including first and second bitmaps corresponding to first and second beams 1106 Transmit the indication of the first quantity of beams and bitmap information.

1108 Transmit activation information.

1110 Receive request for transmission of SSB blocks.

1112 Transmit SSB blocks in a first direction of the first beam.

1114 Transmit SSB blocks in a second direction of the second beam.

1116 Transmit downlink transmission.

1118 Receive uplink transmission.

*FIG. 11*

PAIRING OF SYNCHRONIZATION SIGNALS FOR TRACKING AND MEASUREMENT

CROSS-REFERENCE TO RELATED APPLICATIONS

This application claims the benefit of U.S. Provisional Patent Application No. 63/370,302, entitled, "PAIRING OF SYNCHRONIZATION SIGNALS FOR TRACKING AND MEASUREMENT," filed on Aug. 3, 2022, which is expressly incorporated by reference herein in its entirety.

TECHNICAL FIELD

Aspects of the present disclosure relate generally to wireless communication systems, and more particularly, to synchronization signal measurement. Some features may enable and provide improved communications, including synchronization signal pairing.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus includes at least one processor and a memory coupled to the at least one processor. The at least one processor is configured to receive, from a second network node, an indication of a first quantity of beams, to receive, from the second network node, bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, and to generate first measurement information based on the bitmap information.

In an additional aspect of the disclosure, a method for wireless communication includes receiving, by a first network node from a second network node, an indication of a first quantity of beams, receiving, from the second network node, bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, and generating first measurement information based on the bitmap information.

In an additional aspect of the disclosure, an apparatus includes means for receiving, by a first network node from a second network node, an indication of a first quantity of beams, means for receiving, from the second network node, bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, and means for generating first measurement information based on the bitmap information.

In an additional aspect of the disclosure, an apparatus includes at least one processor and a memory coupled to the at least one processor. The at least one processor is configured to generate an indication of a first quantity of beams, generate bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, transmit, to the second network node, the indication of a first quantity of beams, transmit, to the second network node, the bitmap information, transmit one or more of the first set of SSB blocks in the first direction, and transmit one or more of the second set of SSB blocks in the second direction.

In an additional aspect of the disclosure, a method for wireless communication includes generating an indication of a first quantity of beams, generating bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, transmitting, to the second network node, the indication of a first quantity of beams, transmitting, to the second network node, the bitmap information, transmitting one or more of the first set of SSB blocks in the first direction, and transmitting one or more of the second set of SSB blocks in the second direction.

In an additional aspect of the disclosure, a method for wireless communication includes means for generating an indication of a first quantity of beams, means for generating bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, means for transmitting, to the second network node, the indication of a first quantity of beams, means for transmitting, to the second network node, the bitmap information, means for transmitting one or more of the first set of SSB blocks in the first direction, and means for transmitting one or more of the second set of SSB blocks in the second direction.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5A is an example set of SSB block bitmaps according to one or more aspects.

FIG. 5B is an example set of SSB block bitmaps according to one or more aspects.

FIG. 5C is an example set of SSB block bitmaps according to one or more aspects.

FIG. 5D is an example set of SSB block bitmaps according to one or more aspects.

FIG. 5E is an example set of SSB block bitmaps according to one or more aspects.

FIG. 5F is an example set of SSB block bitmaps according to one or more aspects.

FIG. 11 is a flow chart diagram illustrating an example process that supports synchronization signal pairing according to one or more aspects.

Like reference numbers and designations in the various drawings indicate like elements.

DETAILED DESCRIPTION

Figure 1:
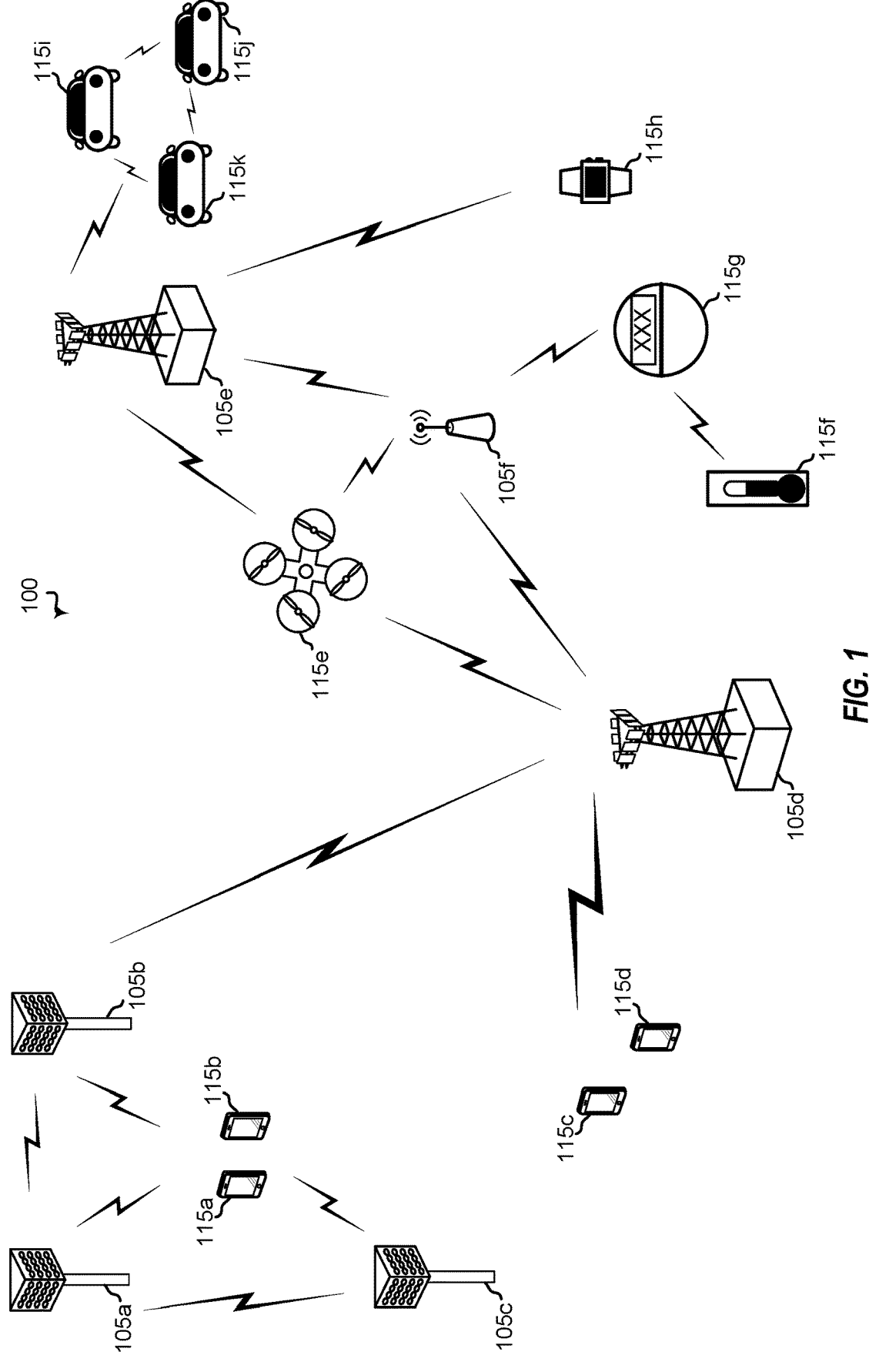
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5 th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, MHz, and the like bandwidth. For other various outdoor and small cell coverage deployments of TDD greater than 3 GHz, subcarrier spacing may occur with 30 kHz over MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
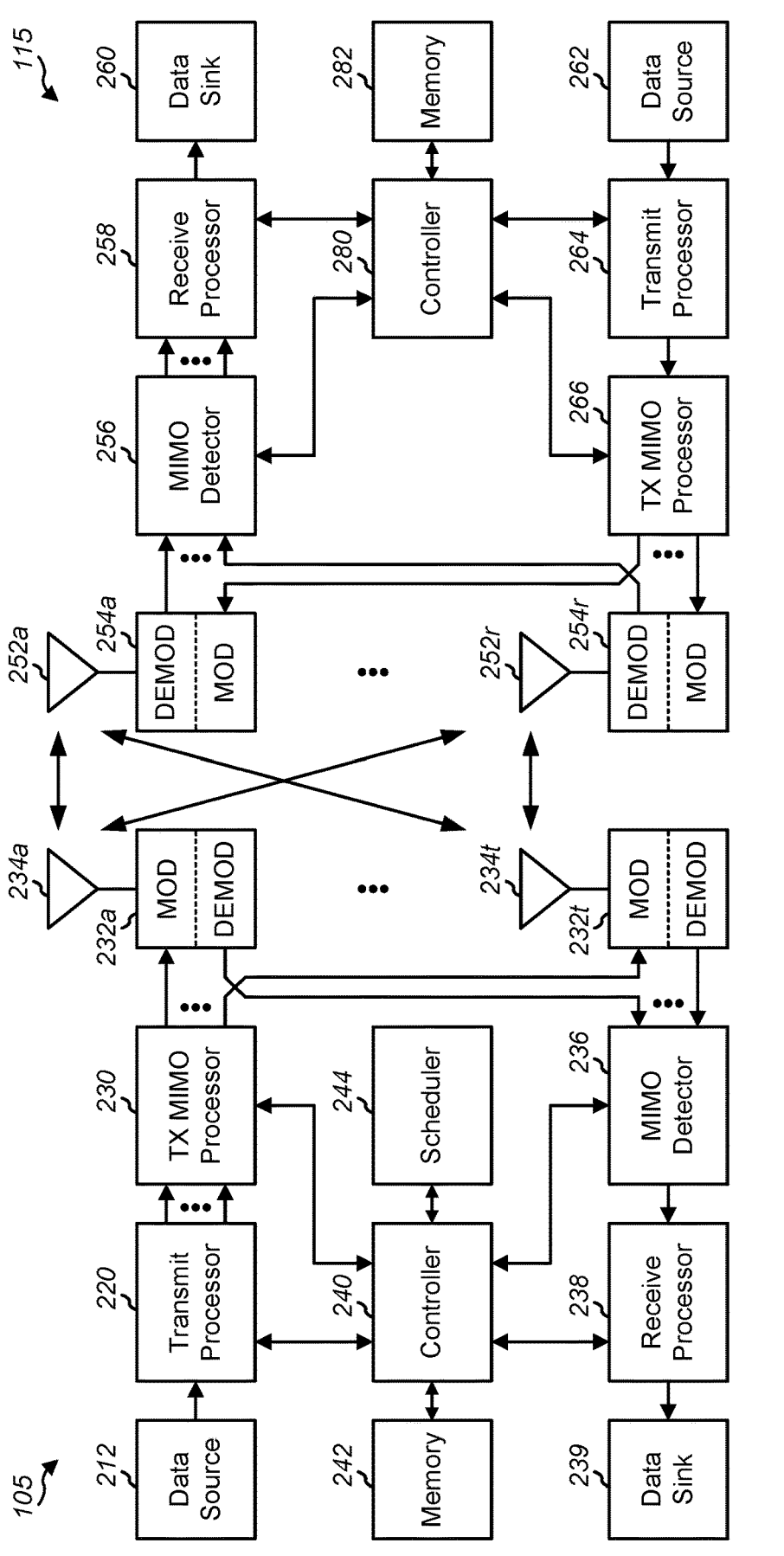
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 10-11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

A base station may provide a UE with beam-specific SSB block transmission information to allow the UE to pair measurement or processing of measurements of SSB blocks transmitted in a direction of a particular beam. SSB blocks that are transmitted in a direction of a beam may, for example, be SSB blocks that are transmitted using the same spatial parameters of a beam, such as SSB blocks with a same quasi-colocation (QCL) state as a beam or SSB blocks transmitted using a same transmit control information (TCI) state as the beam.

A base station may provide a UE with a quantity of beams that the base station will use to transmit SSB blocks. A base station may also provide a UE with an SSB block bitmap for each respective beam of the quantity of beams, indicating timing information for transmission of SSB blocks in a direction of each respective beam. The SSB block bitmaps for each beam may, for example, be SSB block bitmaps for SSB blocks transmitted in a same direction of each respective beam, such as QCL SSB blocks or SSB blocks sharing a same TCI state, located in a same SSB block burst transmission. The UE may use the bitmaps to pair measurement and/or processing of SSB information for SSB blocks sharing the same spatial and/or beamforming parameters, such as SSB blocks transmitted in a same direction of a same beam. Such pairing can be performed for SSB blocks sharing a same direction of a same beam located in a same SSB burst transmission or across multiple SSB burst transmissions. Furthermore, such bitmaps may be used in pairing SSB blocks with downlink or uplink channels sharing a same direction of a same beam, such as downlink or uplink transmissions transmitted using a same QCL state or TCI state through application of a spatial filter associated with the QCL state or TCI state, for more efficient measurement of SSB blocks prior to receipt of a physical downlink control channel (PDCCH) or physical downlink shared channel (PDSCH) by the UE or prior to transmission of a physical uplink control channel (PUCCH) or physical uplink shared channel (PUSCH) by the UE.

Use of beam-specific SSB block bitmaps may enhance UE efficiency, reliability, and accuracy in processing SSB block measurements. For example, use of such bitmaps may enhance reliability and reduce latency in frequency tracking loop (FTL) based high-doppler detection scenarios, such as in high-speed train and unmanned aerial vehicle scenarios, for conditional handover, radio link monitoring, radio resource management, beam management, and antenna port selection. Use of such bitmaps may also provide power saving enhancements, such as enabling longer sleep states with fewer wake-up conditions for measurement or tracking loop maintenance in idle or inactive mode. For example, enhanced power savings may be enabled in connected mode discontinuous reception (C-DRX) scenarios. Use of such bitmaps may also reduce network overhead for periodic and wideband reference signals, such as periodic tracking reference signals (TRS), phase tracking reference signals (PTRS), or channel state information reference signals (CSI-RS).

Figure 3:
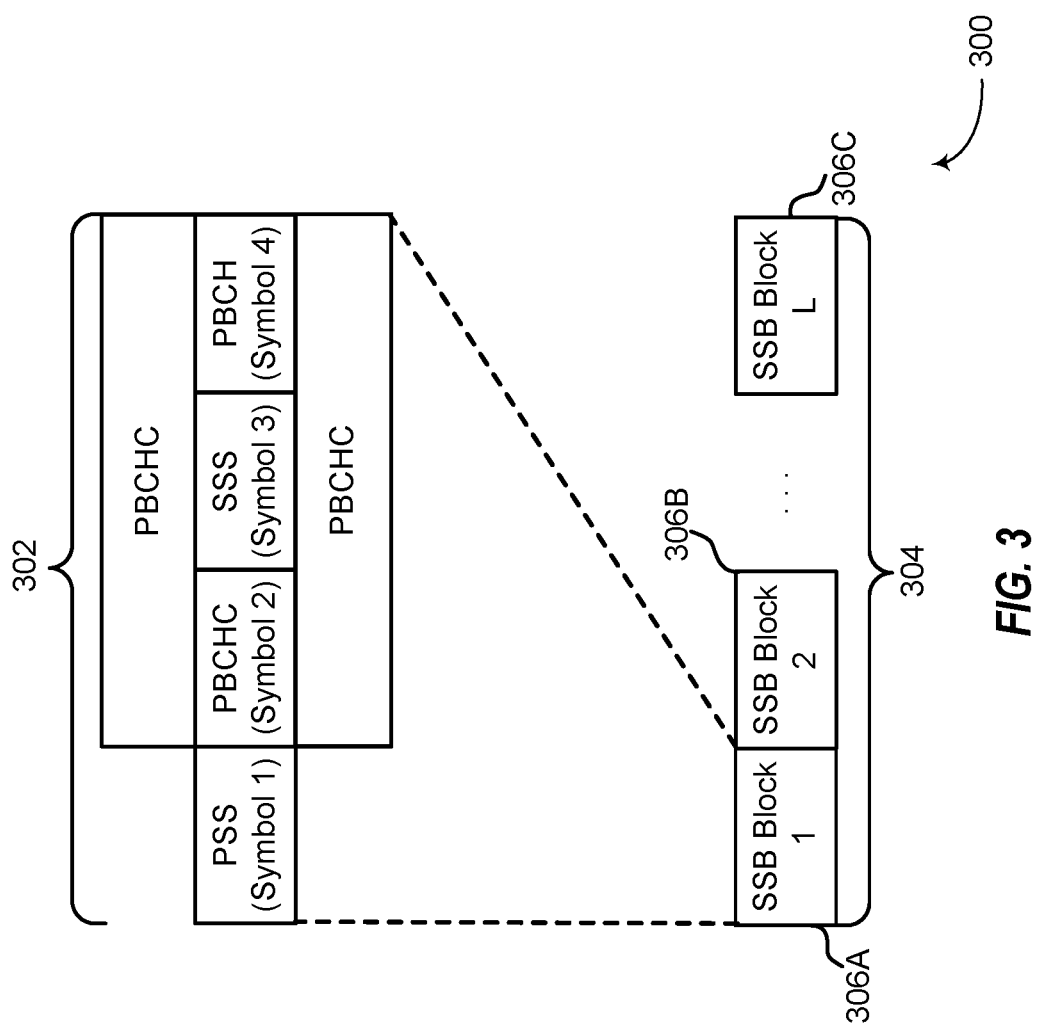
FIG. 3 is a block diagram illustrating an example of a synchronization signal physical broadcast channel (SSB) block burst according to one or more aspects.

Synchronization signals and physical broadcast channel transmissions may be combined in SSB blocks for efficient signal measurement by a UE. An example SSB block 302 is shown in the diagram 300 of FIG. 3. An SSB block may include a primary synchronization signal, a secondary synchronization signal, and one or more physical broadcast channel elements (PBCHC). An SSB may, for example, include four symbols. Multiple SSB blocks 306A-C may be transmitted sequentially in time in an SSB block burst transmission 304. An SSB block burst transmission 300 may include one or more SSB blocks broadcast in a cell and may be periodically repeated. Such repetition can be used for re-transmission of the SSB blocks or for beam-sweeping applications. The SSB block burst transmission 304 may be transmitted in a 5 millisecond window, or half a frame. Alternatively other time windows may be used for transmission of an SSB block burst transmission. An SSB block index for each transmitted SSB block may be encoded in a PBCH demodulation reference signal (DMRS). For example, some SSB blocks may be transmitted using a same beam in a particular direction, such as using QCL antenna ports of a base station having a same gain and beamforming function or having a same TCI state. Thus, delay spread, Doppler spread, Doppler shift, average gain, average delay, and spatial parameters may be similar or identical for multiple SSB blocks transmitted at different times in a same direction of a same beam.

A maximum quantity of SSB blocks that may be included in an SSB block burst transmission 300 may depend on a carrier frequency. For a carrier frequency of less than or equal to 3 GHz with a subcarrier spacing of 15 kHz or 30 kHz, a maximum quantity of SSB blocks in an SSB block burst transmission may be four. For a carrier frequency between 3 GHz and 6 GHz with a subcarrier spacing of 15 kHz or 30 kHz, a maximum quantity of SSB blocks in a SSB block burst transmission may be eight. For a carrier frequency over 6 GHz with a subcarrier spacing of 120 kHz or 240 kHz, a maximum quantity of SSB blocks in an SSB block burst transmission may be sixty-four. In essence, a higher frequency may entail use of a more narrow beam for transmission of the SSB blocks with a greater number of steps of beam sweeping to measure the SSB blocks. Thus, greater quantities of SSB blocks in each SSB block burst transmission may be used with higher operating frequencies.

SSB blocks may be beamformed for transmission and may be transmitted in a direction of a specific beam. Transmission of SSB blocks in a direction of a specific beam may, for example, include transmission of SSB blocks using a same QCL state or TCI state associated with the beam, such as through application of a same spatial filter when beamforming the SSB block transmission. For example, SSB blocks may be transmitted using QCL antenna ports of a base station having a same gain and beamforming function. Beamforming of SSB blocks may allow for transmission of SSB blocks in specific spatial patterns for more efficient transmission of SSB blocks by a base station and reception of SSB blocks by a UE. For example, in urban settings beamforming may be applied for transmission of SSB blocks and other signals along streets and other open areas to minimize waste energy on transmission in directions of beams that may encounter interference, such as interference by buildings or other interference sources, or in directions of beams that do not correspond to an intended recipient UE.

Multiple SSB blocks that are transmitted in a same direction of a same beam may have the same beamforming parameters applied, and such beamforming parameters may be defined by a QCL state or TCI state shared by the transmitted SSB blocks, such as through application of a same spatial filter associated with the QCL state or the TCI state to the SSB blocks when transmitted. Thus, a first set of SSB blocks transmitted in a first direction of a first beam may be transmitted using a same QCL state or TCI state associated with the first beam, while a second set of SSB blocks transmitted in a second direction of a second beam may be transmitted using a same QCL state or TCI state associated with the second beam, and the first direction, along with the associated QCL state or TCI state of the first direction of the first beam, may be different from the second direction, along with the associated QCL state or TCI state of the second direction of the second beam.

In some cases, SSB blocks may be characterized as cell-defining SSB (CD-SSB) blocks or non-cell-defining (NCD-SSB) blocks. CD-SSB blocks may be beamformed and transmitted on a sync raster and may be associated with a master information block-configured initial downlink bandwidth part. CD-SSB blocks may be scanned or measured by a UE in an initial cell setup process when initiating a connection to a cell, such as during a cell search or cell selection procedure. For example, a UE may scan or measure one or more CD-SSB blocks for obtaining sync, measurements, and radio link monitoring. NCD-SSB blocks may be beamformed SSB blocks that are not associated with a control resource set (CORESET) #0 or an initial downlink bandwidth part. For example, in some cases NCD-SSB blocks may be configured for transmission in a dedicated downlink bandwidth part of a reduced capability UE, although NCD-SSB blocks may also be configured for transmission to other UEs as well. A UE may use NCD-SSB blocks for some of the same purposes as a CD-SSB of a serving cell, such as obtaining sync, measurements, and radio link monitoring. An NCD-SSB block may, for example, share some parameters with a CD-SSB associated with the same cell, such as a same ssb-periodicity, ssb-PBCH-BlockPower, and other parameters. However, NCD-SSB blocks of a cell may also have parameters that differ from a CD-SSB of the cell, such as a different absolute frequency, a different periodicity, or a different time offset.

A UE may be configured to perform measurements of SSB blocks within a particular bandwidth part. In some cases, a bandwidth part of a UE may not overlap the bandwidth on which a CD-SSB block is transmitted by a serving cell. Thus, once the UE has formed an initial connection with the cell using the CD-SSB block, the UE may proceed to perform measurements of an NCD-SSB block for synchronization purposes on a more narrow bandwidth that does not overlap with a bandwidth on which the CD-SSB block is transmitted. The use of a more narrow bandwidth may result in power savings. Thus, both reduced-capability and non-reduced-capability UEs may perform measurements of NCD-SSB blocks. Furthermore, NCD-SSB blocks may be transmitted by a base station and measured by a UE while the UE is in a connected state, a semi-connected state, an idle state, or an inactive state with respect to the base station.

For NCD-SSB blocks or CD-SSB blocks, a quantity of actually transmitted SSB blocks in a burst transmission associated with different beams, such as transmitted in directions of different respective beams, may be less than or equal to a total quantity of actually transmitted SSB blocks in the burst transmission. The quantity of actually transmitted SSB blocks in the burst transmission may be less than or equal to a maximum quantity of SSB blocks for transmission in a burst transmission. In some scenarios, it may be useful to a UE to pair SSB blocks of a burst set, or of multiple burst sets, that are transmitted in a direction of a same beam, such SSB blocks that are transmitted having a same QCL state or SSB blocks that are transmitted having a same TCI state. Such pairing can allow for more efficient measurement, processing, or tracking of SSB block transmission.

Wideband reference signals such as TRS or CSI-RS may not be periodically transmitted in a network. NCD-SSB or CD-SSB blocks may be periodically transmitted and sensed by a UE. Furthermore, coverage area of a cell may not be symmetrical and may be influenced by geography or location, such as by presence of a railway, a bridge or river, or urban streets. Given the potential for asymmetrical cell shape, a cell may not beamform SSB blocks along the maximum quantity of beams. Thus, a quantity of beams for transmission of SSB blocks by a cell may vary and a quantity of SSB blocks transmitted in a direction of each beam may also vary. To facilitate UE measurement of SSB blocks transmitted in a direction of \ a particular beam, a base station may provide an indication to a UE of a beam of each SSB block in a set of SSB blocks, such as an SSB block burst transmission. For example, a base station may transmit an actual quantity of beams for transmission of SSB blocks by the base station along with a beam-specific bitmap for each beam indicating times at which SSB blocks for transmission in a direction of each respective beam are to be transmitted. Thus, if a base station is configured to transmit SSB blocks using three different beam directions, the base station may transmit three beam-specific bitmaps to the UE. The UE may pair the SSB blocks transmitted in a direction of the same beam for measurement or processing.

Figure 4:
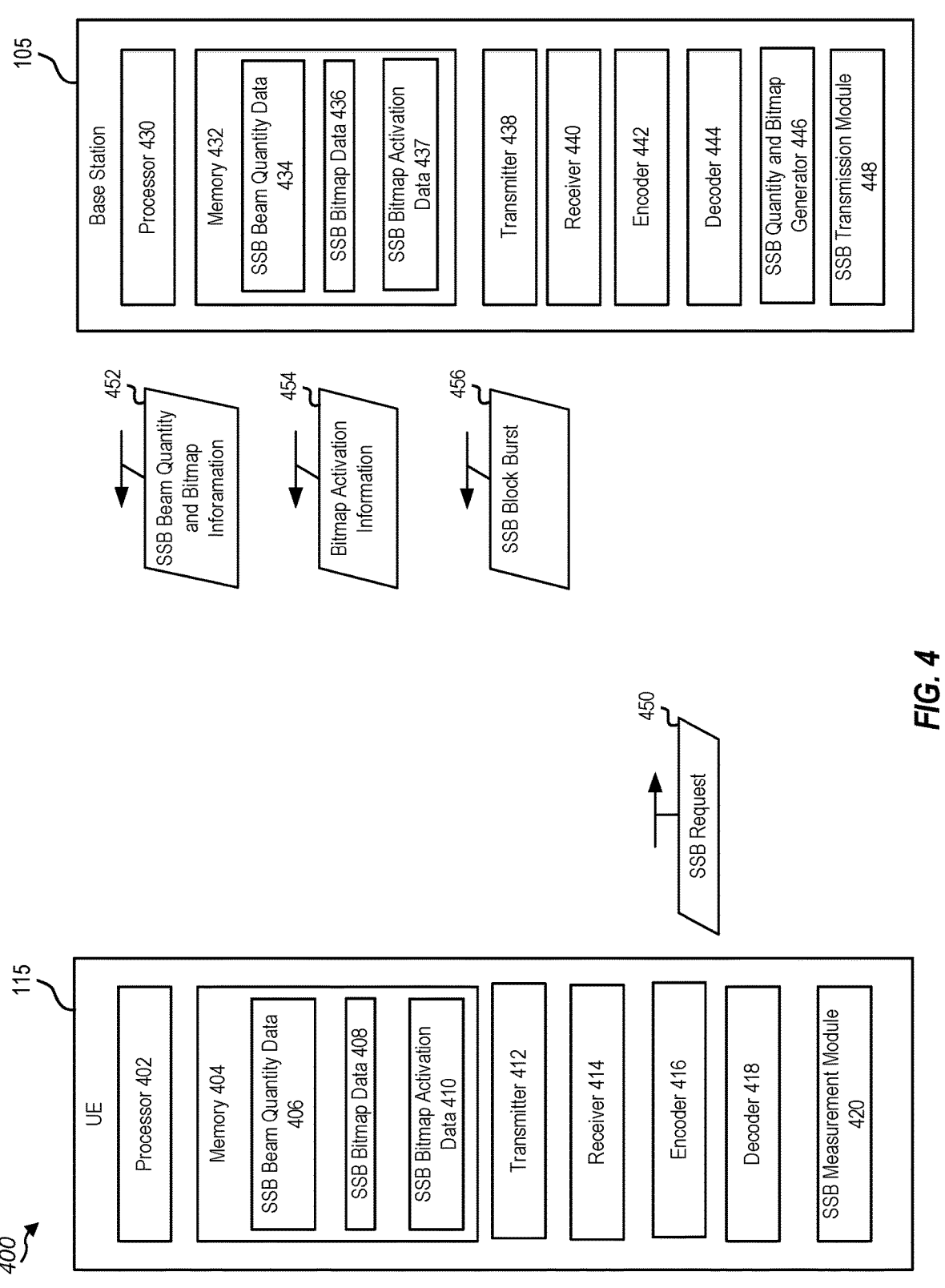
FIG. 4 is a block diagram illustrating an example wireless communication system that supports synchronization signal pairing according to one or more aspects.

FIG. 4 is a block diagram of an example wireless communications system 400 that supports synchronization signal pairing according to one or more aspects. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 412 (hereinafter referred to collectively as "transmitter 412"), one or more receivers 414 (hereinafter referred to collectively as "receiver 414"), one or more encoders 416 (hereinafter referred to collectively as "encoder 416"), and one or more decoders 418, (hereinafter referred to collectively as "decoder 418"). Processor 402 may be configured to execute instructions stored in memory 404 to perform the operations described herein. In some implementations, processor 402 includes or corresponds to one or more of receive processor 258, transmit processor 264, and controller 280, and memory 304 includes or corresponds to memory 282.

Memory 304 includes or is configured to store SSB beam quantity data 406, SSB bitmap data 408, and SSB bitmap activation data 410. SSB beam quantity data 406 may, for example, include a quantity of beams on which SSB blocks will actually be transmitted by the base station 105. The SSB beam quantity data 406 may, in some embodiments, apply to a specific SSB block burst. In some embodiments, the SSB beam quantity data 406 may include multiple quantities of beams, each quantity applying to a specific SSB block burst. SSB bitmap data 408 may include one or more beam-specific bitmaps for transmission of SSB blocks. Each beam-specific bitmap of the SSB bitmap data 408 may, for example, include information indicating one or more times of transmission of SSB blocks in a direction of each respective beam. In some embodiments, each beam-specific bitmap may include a quantity of bits equal to a maximum quantity of SSB blocks to be transmitted in an SSB block burst transmission. Thus, each beam-specific bitmap may indicate one or more times at which an SSB block will be transmitted in a direction of the associated beam by the base station 105. SSB bitmap activation data 410 may include an activation status of one or more beam-specific bitmaps of the SSB bitmap activation data 410. For example, UE 115 may receive one or more beam-specific bitmaps from the base station 105, but the received bitmaps may remain inactive until the UE 115 receives an activation instruction from the base station 105. Thus, the UE 115 may refrain from measuring SSB blocks transmitted by the base station 105 based on the received SSB bitmaps until activation data, such as an activation instruction, is received from the base station 105.

Transmitter 412 is configured to transmit reference signals, control information and data to one or more other devices, and receiver 414 is configured to receive references signals, synchronization signals, control information and data from one or more other devices. For example, transmitter 412 may transmit signaling, control information and data to, and receiver 414 may receive signaling, control information and data from, base station 105. In some implementations, transmitter 412 and receiver 414 may be integrated in one or more transceivers. Additionally or alternatively, transmitter 412 or receiver 414 may include or correspond to one or more components of UE 115 described with reference to FIG. 2.

The UE 115 may also include an SSB measurement module 420. The SSB measurement module 420 may for example include instructions executable by the processor 402 to perform the functions described herein. The SSB measurement module 420 may, for example, generate measurement information for of one or more SSB blocks transmitted by the base station 105 based on the SSB beam quantity data 406, the SSB bitmap data 408, or the SSB bitmap activation data 410. For example, when one or more beam-specific SSB bitmaps of the SSB bitmap data 408 are activated based on the SSB bitmap activation data 410, the SSB measurement module 420 may measure one or more QCL SSB blocks indicated by one or more of the beam-specific SSB bitmaps. For example, the SSB measurement module may sense one or more SSB block transmissions to measure one or more parameters, such as timing, signal strength, and interference, of the one or more SSB block transmissions. The SSB measurement module 420 may further use the measurement information to synchronize the UE with the base station. For example, the SSB measurement module 420 may use the measurement information to synchronize timing of transmission and reception of data by the UE with transmission and reception of data by the base station.

Base station 105 may include a variety of components (such as structural, hardware components) used for carrying out one or more functions described herein. For example, these components may include one or more processors 430 (hereinafter referred to collectively as "processor 430"), one or more memory devices 432 (hereinafter referred to collectively as "memory 432"), one or more transmitters 438 (hereinafter referred to collectively as "transmitter 438"), one or more receivers 440 (hereinafter referred to collectively as "receiver 440"), one or more encoders 442 (hereinafter referred to collectively as "encoder 442"), and one or more decoders 444 (hereinafter referred to collectively as decoder 444). Processor 430 may be configured to execute instructions stored in memory 354 to perform the operations described herein. In some implementations, processor 430 includes or corresponds to one or more of receive processor 238, transmit processor 220, and controller 240, and memory 354 includes or corresponds to memory 242.

Memory 354 includes or is configured to store SSB beam quantity data 434, SSB bitmap data 436, and SSB bitmap activation data 437. SSB beam quantity data 434 may, for example, include a quantity of beams on which SSB blocks will actually be transmitted by the base station 105. The SSB beam quantity data 434 may, in some embodiments, apply to a specific SSB block burst. In some embodiments, the SSB beam quantity data 434 may include multiple quantities of beams, each quantity applying to a specific SSB block burst. SSB bitmap data 436 may include one or more beam-specific bitmaps for transmission of SSB blocks. Each beam-specific bitmap of the SSB bitmap data 408 may, for example, include information indicating one or more times of transmission of SSB blocks in a direction of each respective beam. In some embodiments, each beam-specific bitmap may include a quantity of bits equal to a maximum quantity of SSB blocks to be transmitted in an SSB block burst transmission. Thus, each beam-specific bitmap may indicate one or more times at which an SSB block will be transmitted in a direction of a specific beam by the base station 105. SSB bitmap activation data 437 may include an activation status of one or more beam-specific bitmaps of the SSB bitmap data 436 by one or more UEs, such as UE 115.

Transmitter 438 is configured to transmit reference signals, synchronization signals, control information and data to one or more other devices, and receiver 440 is configured to receive reference signals, control information and data from one or more other devices. For example, transmitter 438 may transmit signaling, control information and data to, and receiver 440 may receive signaling, control information and data from, UE 115. In some implementations, transmitter 438 and receiver 440 may be integrated in one or more transceivers. Additionally or alternatively, transmitter 438 or receiver 440 may include or correspond to one or more components of base station 105 described with reference to FIG. 2.

The base station 105 may also include an SSB quantity and bitmap generator 446 that may generate SSB beam quantity data 434 and SSB bitmap data 436 for transmission to UE 115. For example, the SSB quantity and bitmap generator 446 may include instructions executable by the processor 430 to perform the functions of the SSB quantity and bitmap generator 446 described herein. The SSB quantity and bitmap generator 446 may determine an actual quantity of beams on which SSB blocks will be transmitted, either in general or for a specific set of SSB block burst transmissions, and may determine SSB beam quantity data 434 based on the actual quantity of beams. The SSB quantity and bitmap generator 446 may also determine when SSB blocks will be transmitted in a direction of a particular beam, such as which slot of an SSB block burst transmission SSB blocks QCL on a beam will be transmitted. The SSB quantity and bitmap generator 446 may make such a determination for each beam for transmission of SSB blocks in the SSB block burst transmission. The SSB quantity and bitmap generator 446 may then generate beam-specific bitmaps for each respective beam for transmission of SSB blocks in an SSB block burst transmission. A beam-specific bitmap may, for example, indicate one or more slots in which SSB blocks will be transmitted in a direction of a beam in the SSB burst transmission and one or more slots in which SSB blocks will not be transmitted in the direction of the beam in the SSB burst transmission. For a single SSB burst transmission, the SSB quantity and bitmap generator 446 may thus generate up to three, or more, beam-specific bitmaps.

The base station 105 may also include an SSB transmission module 448. The SSB transmission module 448 may include instructions executable by the processor 430 to perform the functions of the SSB transmission module 448 described herein. For example, the SSB transmission module 448 may cause the base station 105 to transmit one or more SSB block burst transmissions, such as CD-SSB or NCD SSB block burst transmissions, to the UE 115 for measurement of one or more SSB blocks by the UE 115. The SSB transmission module may further cause the base station 105 to transmit SSB beam quantity data 434 and SSB bitmap data 437 to the UE 115.

In some implementations, wireless communications system 400 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, the base station 105 may transmit SSB beam quantity and bitmap information 452 to the UE 115. The SSB beam quantity and bitmap information 452 may, for example, include SSB beam quantity data 434 and SSB bitmap data 436. In some embodiments, the base station 105 may split the SSB beam quantity data 434 and the SSB bitmap data 436 for transmission across two or more transmissions. The base station 105 may also transmit a bitmap activation information 454 to the UE 115. For example, after the base station 105 transmits SSB beam quantity and bitmap information 452 to the UE 115, the SSB beam quantity data 406 and SSB bitmap data 408 may be automatically activated in the UE for use by the UE in measuring one or more SSB blocks, or the UE 115 may wait for receipt of a bitmap activation information 454 from the base station 105 before using the received SSB beam quantity data 406 or SSB bitmap data 408.

The UE 115 may transmit an SSB request 450 to the base station 105 to request that the base station 105 transmit one or more SSB blocks indicated by the SSB bitmap data 408, such as to request that the base station 105 transmit a SSB block burst transmission indicated by one or more beam-specific bitmaps of the SSB bitmap data 408. For example, the base station 105 may transmit SSB blocks, such as NCD-SSB blocks, in a semi-static or aperiodic configuration. The UE 115 may transmit an SSB request 450 to request that the base station transmit semi-static or aperiodic SSB blocks, such as a semi-static or aperiodic NCD-SSB block burst transmission. In some embodiments, the SSB request 450 may be a report by the UE 115, such as a report of a status of the UE 115, or a report of occurrence of a preconfigured event.

The base station 105 may transmit one or more SSB block bursts 456 to the UE. The SSB block bursts 456 may, for example, include SSB blocks indicated by the SSB bitmap data 408 stored by the UE 115. In some embodiments, the base station 105 may transmit the SSB block bursts 456 in response to a received SSB request 450.

Example bitmaps for SSB blocks, transmitted by a base station to a UE, are shown in FIGS. 5A-5F. The bitmaps of FIGS. 5A-5F may, for example, be bitmaps for SSB block burst transmissions. A maximum number of slots for transmission of SSB blocks within a burst in bitmaps 5A-5F may be eight, although other maximum numbers of blocks within an SSB block burst may be used. An SSB block burst transmission may be divided into the maximum number of slots for transmission of zero or one SSB blocks in each slot. An SSB block burst transmission may have a maximum length of one half frame or 5 ms. Thus, the length of each slot for transmission of an SSB block within an SSB block burst may vary based on a maximum number of SSB blocks that may be transmitted within the SSB block burst transmission. A value of 1 may indicate that an SSB block is transmitted in the slot, while a value of 0 may indicate that an SSB block is not transmitted in the slot. Thus, an SSB bitmap transmitted from a base station to a UE, such as a beam-specific bitmap may include eight bits, more than eight bits, or fewer than eight bits.

Bitmap set 500 of FIG. 5A may include a single bitmap. The single bitmap may, for example, be a bitmap indicating transmission slots of an SSB burst for all SSB blocks in the SSB burst transmission, regardless of a beam for transmission of the SSB blocks in the SSB burst transmission. Thus, the bitmap of bitmap set 500 may not be beam-specific and may not enable pairing of synchronization signals for tracking and measurement. As shown in the bitmap of bitmap set 500, SSB blocks will be transmitted by the base station at slots 0-5, but not at slots 6-7, of the SSB burst transmission.

Bitmap set 510 of FIG. 5A may include three beam-specific bitmaps, bitmap 1 for a first beam, bitmap 2 for a second beam, and bitmap 3 for a third beam. Thus, the bitmap set 510 may indicate both positions in a burst, such as times within a burst, at which SSB blocks will be transmitted, as well as directions in which the SSB blocks will be transmitted, such as the directions of the beams of each of the beam-specific bitmaps. For example, as shown by the bitmap set 510 of FIG. 5B, a base station transmitting the burst transmission described by bitmap set 510 will transmit an SSB block in each of slots 0-5, but not in slots 6-7. Furthermore, the SSB blocks transmitted at slots 0 and 3 will be transmitted in a first direction of a first beam of bitmap 1, the SSB blocks transmitted at slots 1 and 4 will be transmitted in a second direction of a second beam of bitmap 2, and the SSB blocks transmitted at slots 2 and 5 will be transmitted in a third direction of a third beam of bitmap 3. The burst transmission, however will not include SSBs transmitted at blocks 1-2 or 4-7 in the first direction of the first beam of bitmap 1, at blocks 0, 2-3, and 5-7 in the second direction of the second beam of bitmap 2, or at blocks 3-4, or 6-7 in the third direction of the third beam of bitmap 3. Thus, the beam-specific bitmaps of FIG. 5B, and FIGS. 5C-5E may enable a UE to generate and process measurement information for SSB blocks transmitted in specific beam directions, such as SSB blocks that are QCL or transmitted using a same TCI state. SSB blocks sharing a same beam direction according to the bitmap set 510 may, for example, be transmitted in an interleaved pattern, with one or more slots lacking transmission of an SSB on a first beam between a first SSB block transmission on the first beam and a second SSB block transmission on the first beam. For the bitmap set 510, a maximum number of SSB blocks that may be transmitted in an SSB block burst transmission (L) may be eight, a number of SSB blocks actually transmitted in the SSB block burst transmission ($L_O$) may be six, and a number of beams (M) may be three. Thus, the beam-specific bitmaps of the SSB block burst transmission described by bitmap set 510 may be represented by a matrix of size M*L.

In some embodiments, the set of bitmaps of FIG. 5B may apply to a CD-SSB block burst transmission or to an NCD-SSB block burst transmission. For example, for the bitmap set 510 of FIG. 5B, a UE may receive, from a base station, a first quantity of beams on which SSB blocks will be transmitted in an SSB block burst transmission for a CD-SSB block burst transmission, along with a set of beam-specific bitmaps having a quantity of bitmaps equal to the first quantity, such as two or more beam-specific bitmaps. Likewise a UE may receive, from a base station, a second quantity of beams on which SSB blocks will be transmitted in an SSB block burst transmission for an NCD-SSB block burst transmission, along with a second set of beam-specific bitmaps having a quantity of bitmaps equal to the second quantity, such as two or more beam-specific bitmaps. In some embodiments, a quantity of beams for the CD-SSB block burst transmission may be equal to a quantity of beams for an NCD-SSB block burst transmission. In some embodiments, a quantity of beams for the CD-SSB block burst transmission may be different from a quantity of beams for an NCD-SSB block burst transmission. In some embodiments, beam-specific bitmaps for an NCD-SSB block burst transmission for the same beams as bitmaps for an NCD-SSB block burst transmission may be the same, while in other embodiments bitmaps for the same beams may differ.

Time and spatial pattern configurations of SSB blocks in an SSB block burst transmission, such as numbers of beams for SSB block burst transmissions and/or beam-specific bitmaps, may, for example, be received by a UE from a base station in one or more information elements, such as one or more system information (SI), radio resource control (RRC), media access control control element (MAC CE), or other information elements. A number of beams may, for example, be received in a number-ssb-beams information element transmitted by the base station. The number of beams may, for example, be indicated by a $$\lfloor \log_2^L \rfloor$$

binary string of bits, a binary expansion of the number of different beams used for transmission of SSB blocks in an SSB block burst transmission where L is equal to a maximum number of SSB blocks that can be transmitted in the SSB block burst transmission. One or more beam-specific bitmaps may, for example, be received in one or more ssb-PositionsinBurst-QCL information elements.

The bitmap set 520 of FIG. 5C may, for example, represent three beams on which SSB blocks are transmitted in a consecutive repetition pattern in an SSB block burst. SSB blocks on a same beam are transmitted in adjacent slots in such a pattern.

The bitmap set 530 of FIG. 5D may include two beam-specific bitmaps. In some embodiments, a UE may be configured with different beam-specific bitmap sets for CD-SSB block burst transmissions and NCD-SSB block burst transmissions. For example, in some embodiments CD-SSB blocks of a CD-SSB block burst transmission may be transmitted in three directions of three beams, and may thus be indicated by a bitmap set including three beam-specific bitmaps, such as bitmap set 510 of FIG. 5B, while NCD-SSB blocks of an NCD-SSB block burst transmission may be transmitted in two directions of two beams, and may thus be indicated by a bitmap set including two beam-specific bitmaps, such as bitmap set 530 of FIG. 5D.

In some embodiments, SSB blocks of an SSB block burst transmission may be spatial division multiplexed (SDM) such that SSB blocks of the SSB block burst transmission may be transmitted at a same time, such as in a same slot of the burst transmission, but in different directions of different beams. For example, bitmap set 540 of FIG. 5E includes a first bitmap, indicating transmission of a first SSB block in a first direction of a first beam in a first slot, slot 0, of an SSB block burst transmission and a second SSB block in the first direction of the first beam in a second slot, slot 1, of the SSB block burst transmission and a second bitmap, indicating transmission of a third SSB block in a second direction of a second beam in the first slot, slot 0, of the SSB block burst transmission and a fourth SSB block in the second direction of the second beam in the second slot, slot 1, of the SSB block burst transmission. As another example, bitmap set 550 of FIG. 5F includes spatial division multiplexed SSB block transmissions in slot 0 and slot 2. Furthermore, bitmap set 550 includes a first bitmap, bitmap 1, organized with interlaced pairing of SSB blocks transmitted in the first direction of the first beam, and a second bitmap, bitmap 2, organized with consecutive pairing of SSB blocks transmitted in the second direction of the second beam. Thus, beam-specific bitmaps can describe a variety of organizations of SSB block burst transmissions and may be used by a UE for pairing tracking, measurement, and processing of SSBs of an SSB block burst transmission transmitted in a same direction of a same beam.

Figure 6:
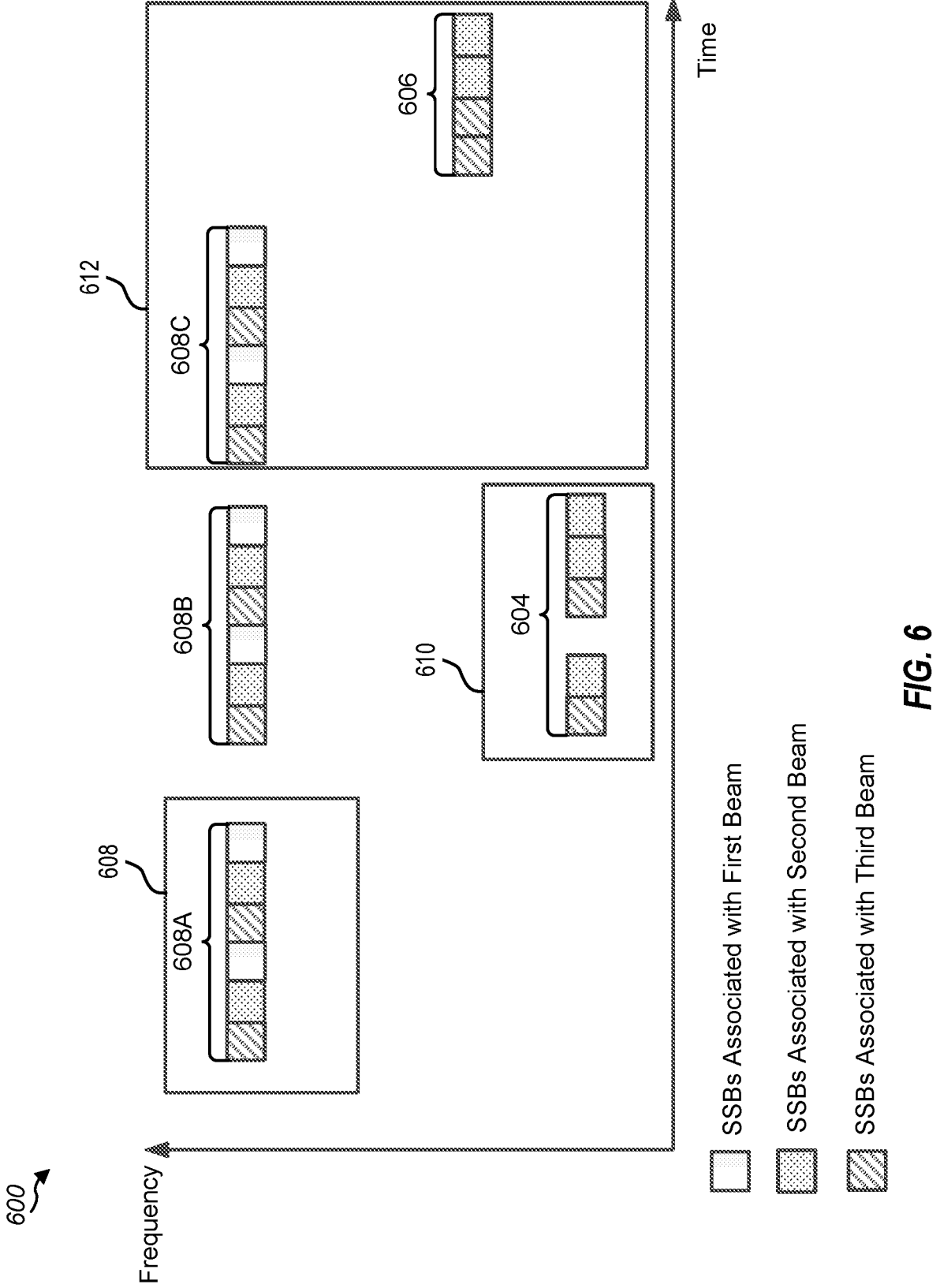
FIG. 6 is a frequency-time diagram of example SSB block transmission according to one or more aspects.

An example diagram 600 of SSB burst transmissions over time for which measurement information may be generated by a UE using beam-specific bitmaps is shown in FIG. 6. SSB burst transmissions 608A-608C may be CD-SSB block burst transmissions, transmitted by a base station at a same frequency multiple times. SSB burst transmissions 604-606 may be NCD-SSB block burst transmissions, transmitted at different frequencies. The CD-SSB block burst transmissions may, for example, include SSB blocks associated with a first bitmap and transmitted in a first direction of a first beam, SSB blocks associated with a second bitmap and transmitted in a second direction of a second beam, and SSB blocks associated with a third bitmap and transmitted in a third direction of a third beam. The SSB blocks of CD-SSB block burst transmissions 608A-C may be transmitted in an interleaved pattern, such as the pattern shown in bitmap set 510 of FIG. 5B. A first NCD-SSB block burst transmission 604 may include SSB blocks transmitted in first, second, fourth, fifth, and sixth slots of the first NCD-SSB block burst transmission 604, but may not include an SSB block in the third slot of the NCD-SSB block burst transmission 604. The first NCD-SSB block burst transmission 604 may be described by first and second bitmaps for first and second beams. A second NCD-SSB block burst transmission 606 may include SSBs transmitted in the same directions of the same beams as the first NCD-SSB block burst transmission 604, but in a different order and may thus be described by a second set of bitmaps, such as third and fourth bitmaps for the first and second beams.

A UE may use beam-specific bitmaps, such as the bitmaps of bitmap set 510, to generate measurement information for one or more SSB blocks of the CD-SSB block burst transmissions 608A-C and beam-specific bitmaps specific to the NCD-SSB block burst transmissions 604 and 606 to generate measurement information for one or more SSB blocks of the NCD-SSB block burst transmissions 604 and 606. For example, at a first time, a UE may be configured to operate in, such as to perform one or more measurements in, a first bandwidth part 608 including a frequency range on which the CD-SSB block burst transmission 608A is transmitted. During the first time the UE may generate measurement information for one or more SSB blocks of the CD-SSB block burst transmission 608A. During a second time, the UE may be configured to operate in, such as to perform one or more measurements in, a second bandwidth part 610 including frequency range on which the NCD-SSB block burst transmission 604 is transmitted, but not including a frequency range on which CD-SSB block burst transmission 608B is transmitted. During the second time the UE may generate measurement information for one or more SSB blocks of the NCD-SSB block burst transmission 604. During a third time, the UE may be configured to operate in, such as to perform one or more measurements in, a third bandwidth part 612 including a frequency range on which the CD-SSB block burst transmission 608C is transmitted and also including a frequency range on which the NCD-SSB block burst transmission 606 is transmitted. During the third time the UE may generate measurement information for one or more SSB blocks of the CD-SSB block burst transmission 608C and for one or more SSB blocks of the NCD-SSB block burst transmission 606. Using beam-specific bitmaps, the UE may pair measurement, sensing, or processing of measurement and sensing information of SSB blocks of an SSB block burst transmission 608A-C, 604, or 606 that are transmitted in a same direction of a same beam. Such pairing may be referred to as intra-burst pairing. As one particular example, in intra-burst pairing, the UE may pair measurement, sensing, or processing of measurement and sensing information of the first and fourth SSB blocks of the CD-SSB block burst transmission 608A.

Figures 7A, 7B, 7C:
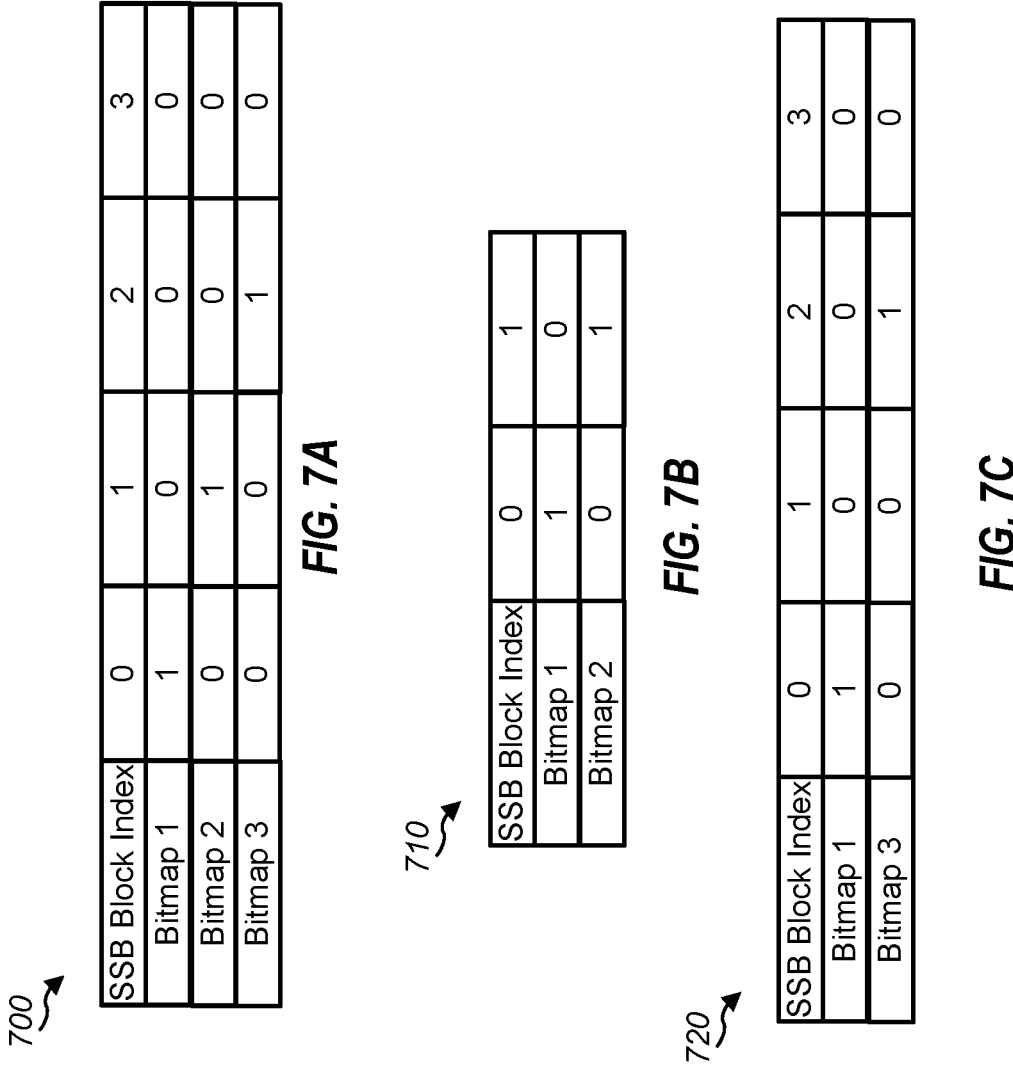
FIG. 7A is an example set of SSB block bitmaps according to one or more aspects.
FIG. 7B is an example set of SSB block bitmaps according to one or more aspects.
FIG. 7C is an example set of SSB block bitmaps according to one or more aspects.

In some embodiments, a UE may pair measurement, sensing, or processing of measurement and sensing information of SSB blocks sharing a same direction of a same beam across multiple SSB block burst transmissions. An example bitmap set 700, shown in FIG. 7A may include three beam-specific bitmaps for a first SSB block burst transmission including a bitmap for a first beam, bitmap 1, a bitmap for a second beam, bitmap 2, and a bitmap for a third beam, bitmap 3. The first SSB block burst transmission may include a maximum number of four SSB blocks. As another example, an example bitmap set 710 of FIG. 7B may include two beam-specific bitmaps for a second SSB block burst transmission including a bitmap for the first beam, bitmap 1, and a bitmap for the second beam, bitmap 2. The second SSB block burst transmission may include a maximum number of two SSB blocks. As another example, an example bitmap set 710 of FIG. 7C may include two beam-specific bitmaps for a third SSB block burst transmissions including a bitmap for the first beam, bitmap 1, and a bitmap for the third beam, bitmap 3. The third SSB block burst transmission may include a maximum number of four SSB blocks. The first, second, and third SSB block burst transmissions may be CD-SSB block burst transmissions or NCD-SSB block burst transmissions. For example, the bitmap set 700 of FIG. 7A may provide SSB block burst transmission information for a first NCD-SSB block burst transmission, the bitmap set 710 of FIG. 7B may provide SSB block transmission information for a second NCD-SSB block burst transmission, and the bitmap set 720 of FIG. 7C may provide SSB block transmission information for a third NCD-SSB block burst transmission. Thus, the first NCD-SSB block burst transmission includes SSB blocks transmitted in a direction of a first beam, a second beam, and a third beam, the second NCD-SSB block burst transmission includes SSB blocks transmitted in a direction of a first beam and a second beam, and the third NCD-SSB block burst transmission includes SSB blocks transmitted in a direction of a first beam and a third beam. A UE may store multiple beam-specific bitmaps for multiple different SSB block burst transmissions and may use the bitmaps for pairing measurement, sensing, or processing of measurement and sensing information of SSB blocks that are transmitted in a same direction of a same beam, but in different SSB block burst transmissions. Such pairing may be referred to as inter-burst pairing.

Figure 8:
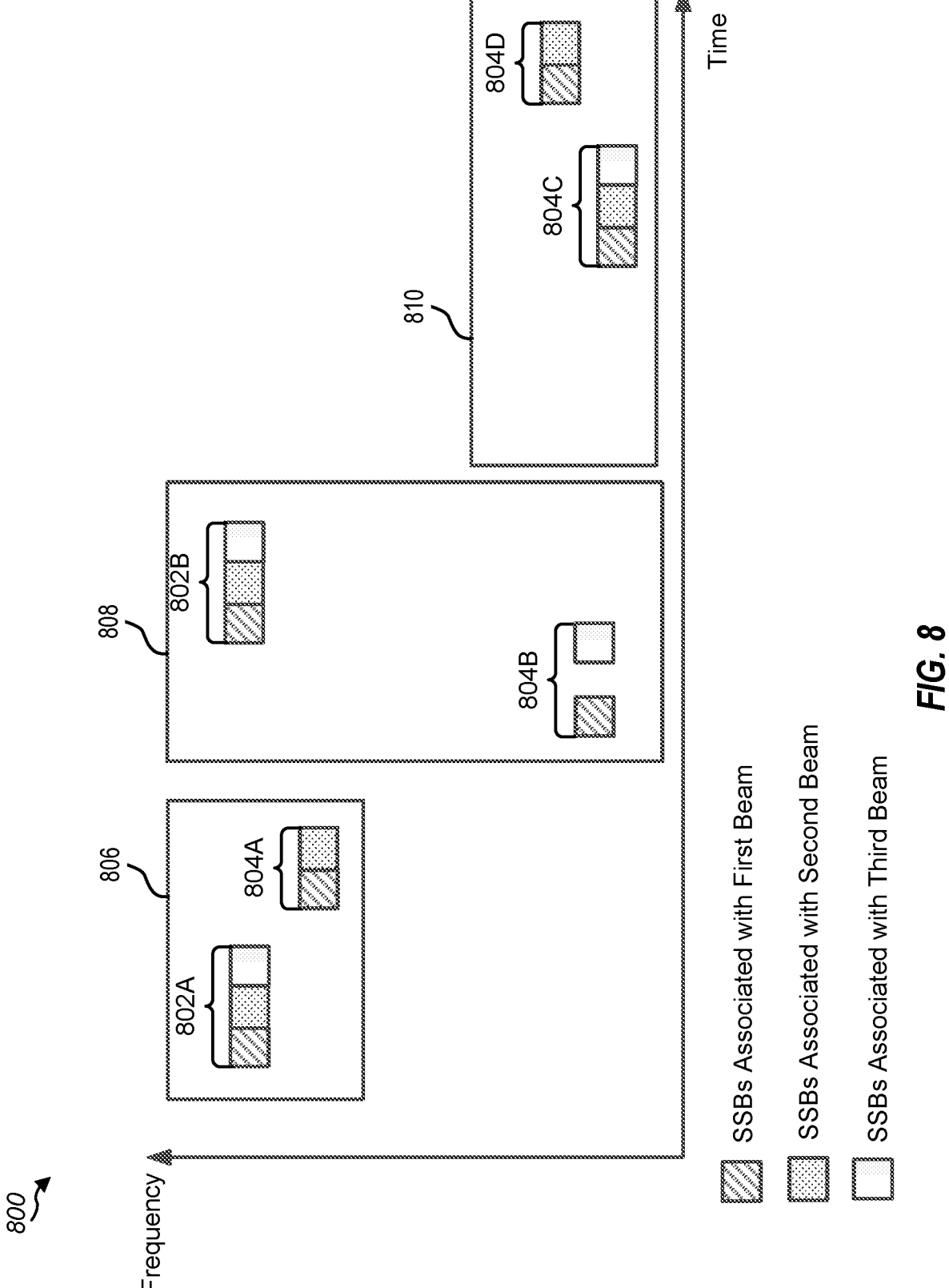
FIG. 8 is a frequency-time diagram of example SSB block transmission according to one or more aspects.

An example diagram 800 of SSB blocks of SSB-block burst transmissions that may be paired for measurement, sensing, or processing across multiple SSB block burst transmissions is shown in FIG. 8. For example, CD-SSB block burst transmissions 802A-B may be transmitted on a same frequency and may correspond to bitmap set 700 of FIG. 7A. SSB blocks transmitted in a first direction of a first beam, such as the first SSB blocks of CD-SSB block burst transmissions 802A-B may be paired for measurement, sensing, or processing. NCD-SSB block burst transmissions 804A-D may be transmitted on different frequencies. NCD-SSB block burst transmissions 804A and 804D may correspond to bitmap set 710 of FIG. 7B, NCD-SSB block burst transmission 804B may correspond to bitmap set 720 of FIG. 7C, and NCD-SSB block burst transmission 804C may correspond to bitmap set 700 of FIG. 7A. Using beam-specific bitmaps for each SSB block burst transmission, such as the beam-specific bitmaps of FIGS. 7A-C, SSB blocks transmitted in a same direction of a same beam may be paired for measurement, sensing, or processing. Such pairing may, for example, include measurement, by a UE, of SSB blocks transmitted in a specific direction of a specific beam selected by a UE while foregoing measurement of other SSBs transmitted in other directions of other beams. For example, a UE may pair measurement of SSBs indicated by first bitmaps of multiple bitmap sets that indicate SSBs transmitted in a first direction of a first beam across multiple SSB block burst transmissions. For example, a UE may pair measurement, sensing, or processing of the first SSB block of NCD-SSB burst transmission 804A, a first SSB block of NCD-SSB burst transmission 804B, a first SSB block of NCD-SSB burst transmission 804C, and a first SSB block of NCD-SSB burst transmission 804D for measurement, sensing, or processing. In some embodiments, a UE may pair measurement, sensing, or processing of SSB blocks transmitted in a first direction of a first beam in both a CD-SSB block burst transmission and an NCD-SSB block burst transmission, such as the first block of CD-SSB block burst transmission 802A and the first block of NCD-SSB block burst transmission 804A. Similar to operation described with respect to FIG. 6, the UE may operate in different bandwidth parts, such as a first bandwidth part 806, a second bandwidth part 808, and a third bandwidth part 810, at different times for measurement, sensing, or processing of SSB blocks included in SSB block burst transmissions transmitted on frequencies within the respective bandwidth parts. As discussed herein, pairing of measurement, sensing, or processing of SSB blocks, transmitted in a same direction of a same beam, of different SSB bursts, such as pairing of measurement, sensing, or processing of a first SSB block of SSB burst 804A and a first SSB block of SSB burst 804C, may be referred to as inter-burst pairing.

A UE may also pair measurement of SSB blocks transmitted in a same direction of a same beam as uplink or downlink transmissions, such as transmitted with a same QCL state or TCI state, for synchronization with a base station. For example, a UE supporting dual connectivity or carrier aggregation may receive an NCD-SSB block burst transmission on a PCell, a PSCell, or an SCell. In order to synchronize transmission of uplink transmissions to or reception of downlink transmissions from a base station and meet timing accuracy requirements, a UE may sense or measure an SSB block transmitted in the same direction of the same beam as the uplink transmission or downlink transmission within a maximum period of time before a beginning of the uplink transmission or downlink transmission. A UE may receive an indication of such a maximum time period from a base station. For example, a base station may set a length of the maximum time period and may notify the UE of the length. The maximum time period may, for example, be set based on a minimum performance requirement associated with a UE capability. An example diagram

Figure 9:
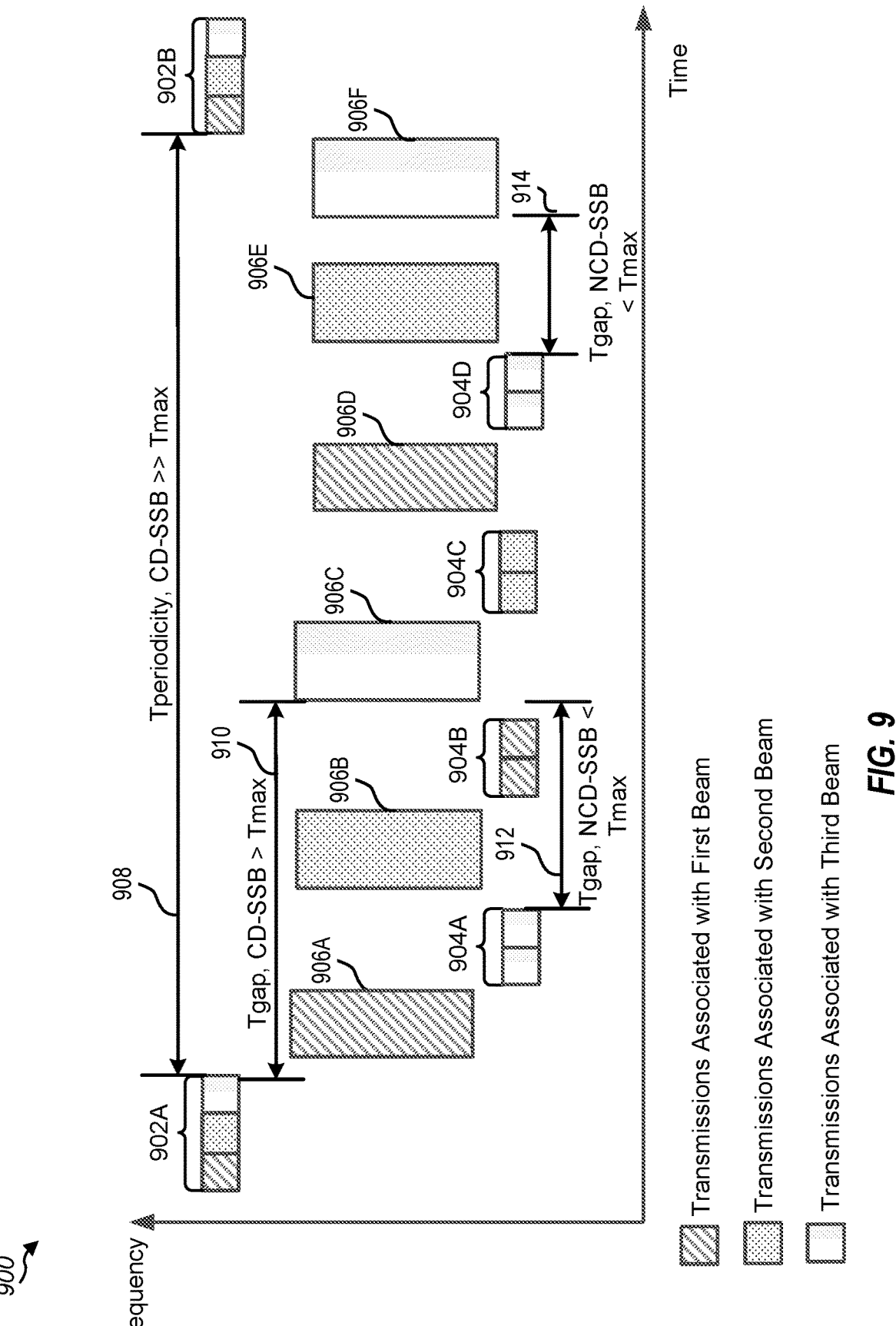
FIG. 9 is a frequency-time diagram of example SSB block transmission according to one or more aspects.

900 of transmission of SSB blocks that may be sensed to fulfill timing requirements is shown in FIG. 9. In some embodiments, CD-SSB block burst transmissions 902A-B may be transmitted at a first periodicity 908. Such a periodicity 908 may however be greater than a maximum time period between sensing of an SSB block transmitted in a direction of the beam and receipt of a downlink transmission or transmission of an uplink transmission in the direction of the beam. A base station may transmit and a UE may measure NCD-SSB block burst transmissions at an interval such that a time between an end of an NCD-SSB block burst transmission and a beginning of an uplink or downlink transmission in a same direction of a same beam as the NCD-SSB block burst transmission is less than the maximum time period. Thus, SSB block transmissions and uplink or downlink channels may be mapped to radio resources for synchronization of uplink and downlink transmission using inter-channel pairing of SSB burst transmissions and uplink or downlink channel transmission.

A UE may receive first and second downlink transmissions 906A and 906D, such as a physical downlink control channel or a physical downlink shared channel transmission, from a first base station transmitted in a first direction of a first beam, such as transmitted using a spatial filter corresponding to a TCI state of a first reference SSB block. For example, the first blocks of CD-SSB block burst transmissions 902A-B may be first reference SSB blocks. A UE may receive a third and fourth downlink transmission 906B and 906E, such as a physical downlink control channel or a physical downlink shared channel transmission, from the first base station transmitted in a second direction of a second beam, which may be the same direction of the same beam as the second block of the CD-SSB block burst transmissions 902A-B. A UE may receive a fifth downlink transmission 906C, such as a physical downlink control channel or a physical downlink shared channel transmission, from the first base station transmitted in a third direction of a third beam, which may be the same direction of the same beam as the third block of the CD-SSB block burst transmissions 902A-B. A UE may transmit a first uplink transmission 906F, such as a physical uplink control channel or a physical uplink shared channel transmission, to the first base station in the third direction of the third beam. NCD-SSB burst transmissions 904A-D may be sensed by the UE to allow the UE to synchronize timing of reception or transmission of information in a same direction as the NCD-SSB burst transmissions 904A-D. For example, a first NCD-SSB burst transmission 904A may be transmitted in the third direction of the third beam. A time 910 between an end of the first CD-SSB burst transmission 902A and a beginning of the fifth downlink transmission 906C may be greater than the maximum time period. However, a time 912 between an end of the first NCD-SSB transmission 904A, transmitted in the same direction of a same beam as the fifth downlink transmission 906C, and a beginning of the fifth downlink transmission 906C may be less than the maximum time period. Thus, the UE may perform one or more measurements of the first SSB block burst transmission 904A to synchronize reception of the fifth downlink transmission 906C from the base station. An SSB block measured to synchronize such reception may, for example, be referred to as a reference SSB block.

As another example, a fourth NCD-SSB block burst transmission 904D may be transmitted in the third direction of the third beam. A time between an end of the first CD-SSB burst transmission 902A and a beginning of the first uplink transmission 906F may be greater than the maximum time period. However, a time 914 between an end of the fourth NCD-SSB transmission 904D, transmitted in the same direction of a same beam as the first uplink transmission 906F, and a beginning of the first uplink transmission 906F may be less than the maximum time period. Thus, the UE may perform one or more measurements of the fourth SSB block burst transmission 904D to synchronize transmission of the first uplink transmission 906F to the base station. An SSB block measured to synchronize such transmission may, for example, be referred to as a reference SSB block. Thus, NCD-SSB or CD-SSB blocks may be time division multiplexed with uplink and downlink transmissions in a same direction of a same beam and transmitted by a base station with a configurable gap between the NCD-SSB or CD SSB blocks and the uplink or downlink transmissions that is less than the maximum time period. An example process 1000 for pairing of synchronization signals for tracking and measurement is shown in the process diagram of FIG. 10. Operations of process 1000 may be performed by a UE, such as UE 115 described above with reference to FIGS. 1, 2, 4, and 12. For example, example operations (also referred to as "blocks") of process 1000 may enable UE 115 to support pairing of synchronization signals for tracking and measurement.

At block 1002, the UE may receive, from a base station, an indication of a first quantity of beams. The indication may, for example, indicate a quantity of beams on which a base station will transmit one or more SSB blocks of an SSB block burst transmission, such as a CD-SSB block burst transmission or an NCD-SSB block burst transmission. In some embodiments, the UE may receive multiple indications of multiple respective quantities of beams, such as a quantity of beams for each of multiple SSB block burst transmissions. In some embodiments, the UE may receive a single indication of a single quantity of beams that applies to multiple SSB block burst transmissions.

At block 1004, the UE may receive, from the base station, bitmap information including first and second bitmaps corresponding to first and second beams. The first and second bitmaps may, for example, correspond to first and second beams for transmission of SSB blocks within an SSB block burst transmission. The first bitmap may correspond to a first beam of the first quantity of beams and may indicate a first set of times for transmission of a first set of SSB blocks by the base station in a first direction of the first beam. The second bitmap may correspond to a second beam of the first quantity of beams, different from the first beam, and may indicate a second set of times for transmission of a second set of SSB blocks by the base station in the second direction of the second beam. For example, within an SSB block burst transmission, one or more SSB blocks may be transmitted in a first direction of a first beam, and one or more SSB blocks may be transmitted in a second direction of a second beam. Transmission of such SSB blocks may be indicated by the first and second bitmaps received by the UE in the bitmap information. A first direction of a first beam may, for example, correspond to a first TCI state or a first QCL state of the first beam, and a second direction of a second beam may, for example, correspond to a second TCI state or second QCL state of the second beam. Thus, SSB blocks transmitted in a same direction of a same beam may share a QCL state or a TCI state associated with the beam. The bitmaps of the bitmap information may be cell-specific, applying to every UE connected to a single cell, group-specific, applying to a particular group of UEs connected to a cell, or UE-specific, applying to a single UE. In some embodiments, the received bitmap information may include one or more bitmaps reconfiguring UE reception of a CD-SSB block transmission, such as reconfiguring UE generation of measurement information for CD-SSB block transmission after the UE is connected to the base station. For example, a pattern of transmission of SSB blocks in a CD-SSB block burst transmission may be reconfigured following connection of the UE to the transmitting base station using the bitmap information.

In some embodiments, the bitmap information may include a first set of bitmaps indicating times for transmission of NCD-SSB blocks and a second set of bitmaps indicating times for transmission of CD-SSB blocks. That is, some bitmaps may apply to NCD-SSB block burst transmissions, some bitmaps may apply to CD-SSB block burst transmissions, and some bitmaps may apply to both NCD-SSB block burst transmissions and CD-SSB block burst transmissions. In some embodiments, the bitmap information may include a different number of bitmaps for a different number of beams for a CD-SSB block burst transmission from a number of bitmaps for a number of beams included for an NCD-SSB block burst transmission.

In some embodiments, the bitmap information may include more than two bitmaps. For example, the bitmap information may include a third bitmap. The third bitmap may correspond to the first beam and may indicate a third set of times for transmission of a third set of SSB blocks by the base station in the first direction of the first beam. For example, a UE may receive multiple bitmaps for a same beam that apply to different SSB block burst transmissions. Such bitmaps may be used for inter-burst pairing of measurement, sensing, or processing of SSB blocks transmitted in a same direction of a same beam.

The bitmaps of the bitmap information may, for example, include a series of ones and zeroes, with the ones indicating presence of an SSB block transmitted in a slot of the SSB burst transmission in the direction of the beam of the bitmap and zeroes indicating that no SSB block will be transmitted in the slot of the SSB burst transmission in the direction of the beam of the bitmap. Thus, the first bitmap may indicate a third set of times at which SSB blocks of the first set of SSB blocks will not be transmitted by the base station in the first direction of the first beam. The bitmaps may indicate different patterns of transmission of SSB blocks in particular directions of particular beams, such as interlaced pairing, consecutive pairing, and spatial division multiplexing of SSB blocks of an SSB block burst transmission. For example, a first bitmap may indicate that one or more slots between two transmissions of SSB blocks in a first direction of a first beam do not include transmission of an SSB block in the first direction of the first beam. Such a pattern may be referred to as interlaced pairing. As another example, a second bitmap of the bitmap information may indicate that slots in which beams are transmitted in the second direction of the second beam are adjacent to each other. Such a transmission pattern may be referred to as consecutive pairing. In some embodiments, first and second bitmaps may indicate that SSB blocks of an SSB block burst transmission are transmitted in the same slot but in different directions of different beams. Such a transmission pattern is called a spatial division multiplexing pattern.

At block 1006, the UE may receive activation information from the base station. For example, when the UE receives the bitmap information and the indication of the first quantity of beams, the UE may store the information in memory. In some embodiments, the bitmap information may be activated upon reception, and the UE may immediately begin to use the bitmap information for generating measurement information following reception, such as for sensing one or more SSB blocks indicated by the bitmap information. In other embodiments, the UE may wait to receive activation information from the base station instructing the UE to begin using the bitmap information for generating measurement information. The activation information may include system information, radio resource control information, media access control control element information, or downlink control information. Thus, in some embodiments, the UE may wait for receipt of activation information before generating measurement information based on received bitmap information.

At block 1008, the UE may transmit a request for SSB block transmission to the base station. The request may be a request for transmission of an NCD-SSB block. In some embodiments, such as when a base station is configured to transmit SSB blocks, such as in SSB block burst transmissions, periodically, a UE may not transmit such a request. In some embodiments, such as when the base station is configured to transmit SSB blocks semi-statically or aperiodically, the base station may wait until a request is received from the UE to transmit one or more SSB blocks, and a UE may transmit such a request to trigger SSB block transmission by the base station.

At block 1010, the UE may receive a downlink transmission. For example, a UE may measure one or more SSB blocks transmitted by the base station within a maximum period of time before receipt of the downlink transmission, as described with respect to FIG. 9, to synchronize reception of downlink transmissions transmitted using a same direction of a same beam as a first reference SSB block. Thus, a UE may receive, from the base station, a downlink transmission transmitted in the first direction of the first beam. The first direction may, for example, be a first direction of a first reference SSB block of the first set of SSB blocks, and the first reference SSB block of the first set of SSB blocks may be time division multiplexed with the downlink transmission. The first reference SSB block may thus be QCL with the downlink transmission. The downlink transmission may be received by the UE within a time period from an end of reception of the first reference SSB block, such as within a maximum time period. In such embodiments the measurement information generated at block 1014 may include measurement information corresponding to the first reference SSB block. For example, the UE may measure the first reference SSB block to synchronize timing for reception of the downlink transmission from the base station. In some embodiments, the first time period, such as a maximum time period, may be signaled to the UE by the base station. In some embodiments, the base station or the UE may determine the maximum time period based on one or more characteristics of the UE or the base station, such as one or more hardware characteristics of the UE or the base station.

At block 1012, the UE may transmit an uplink transmission. For example, a UE may measure one or more SSB blocks transmitted by the base station within a maximum period of time before transmission of the uplink transmission, as described with respect to FIG. 9, to synchronize transmission of uplink transmissions transmitted using a same direction of a same beam as a first reference SSB block. Thus, a UE may transmit, to the base station, an uplink transmission in the first direction of the first beam. The first direction may, for example, be a first direction of a first reference SSB block of the first set of SSB blocks, and the first reference SSB block of the first set of SSB blocks may be time division multiplexed with the uplink transmission. The first reference SSB block may thus be QCL with the downlink transmission, and the UE may apply a spatial filter corresponding to a TCI state of the first reference SSB block to the uplink transmission. The uplink transmission may be transmitted by the UE within a time period from an end of reception of the first reference SSB block, such as within a maximum time period. In such embodiments the measurement information generated at block 1014 may include measurement information corresponding to the first reference SSB block. For example, the UE may measure the first reference SSB block to synchronize timing for transmission of the uplink transmission from the base station. In some embodiments, the first time period, such as a maximum time period, may be signaled to the UE by the base station.

At block 1014, the UE may generate measurement information based on the bitmap information. For example, the UE may sense or measure one or more SSB blocks indicated by the bitmap information, such as one or more SSB blocks transmitted in a same direction of a same beam. The UE may, for example, measure one or more SSB blocks indicated by the first bitmap and one or more SSB blocks indicated by the second bitmap to generate the first measurement information. Such measurement information may include measurement of a timing of one or more SSB blocks, measurement of a signal strength of one or more SSB blocks, or other measurements of the one or more SSB blocks. In some embodiments, the generation of measurement information may be further based on activation information, as described with respect to block 1006. Generation of measurement information may include processing one or more measurements of one or more SSB blocks. The UE may pair measurements of SSB blocks transmitted in a same direction of a same beam for processing. In some embodiments, the UE may generate measurement information using a default configuration when the indication of the first quantity of beams or the bitmap information is not received. For example, the UE may use a non-beam-specific bitmap for the SSB block burst transmission to generate the measurement information.

In some embodiments, an SSB block of the first set of SSB blocks may include a primary synchronization signal (PSS), a physical broadcast channel (PBCH), and a secondary synchronization signal (SSS). The generated measurement information may, for example, correspond to the SSS. For example, in generating the measurement information the UE may measure the SSS of the SSB block. In some embodiments, the UE may refrain from performing one or more measurements of the PSS or the PBCH, only performing one or more measurements of the SSS.

At block 1016, the UE may synchronize with the base station based on the measurement information. For example, the UE may use timing measurements of one or more SSB blocks to synchronize with the base station. As another example, the UE may determine a center frequency of a physical broadcast channel (PBCH) using the measurement information.

An example process 1100 for pairing of synchronization signals for tracking and measurement is shown in the process diagram of FIG. 11. Operations of process 1100 may be performed by a base station, such as base station 105 described above with reference to FIGS. 1, 2, 4 and 13. For example, example operations (also referred to as "blocks") of process 1100 may enable base station 105 to support pairing of synchronization signals for tracking and measurement.

At block 1102, the base station may generate an indication of a first quantity of beams. For example, the base station may determine a number of beams on which the base station will transmit one or more SSB blocks in an SSB block burst transmission. The first quantity of beams may be the first quantity of beams received by the base station at block 1002 of FIG. 10.

At block 1104, the base station may generate bitmap information including first and second bitmaps corresponding to first and second beams. For example, the base station may determine in which slots and in which direction of which beams the base station will transmit one or more SSB blocks for one or more SSB block burst transmissions and may generate one or more bitmaps based on the determination. The bitmap information may, for example, be the bitmap information received by the UE at block 1004 of FIG. 10.

At block 1106 the base station may transmit the indication of the first quantity of beams and the bitmap information. In some embodiments, the indication of the first quantity of and the bitmap information may be transmitted in separate messages, while in other embodiments the indication and the bitmap information may be transmitted in the same message. The indication of the first quantity of beams and the bitmap information may, for example, be transmitted in one or more information elements of SI, RRC, or MAC CE. For example, the indication of the first quantity of beams may be transmitted as a binary number in a number-ssb-beams information element, and each bitmap may be transmitted as a binary bitmap in a respective ssb-PositionsinBurst-QCL information element.

At block 1108, the base station may transmit activation information. For example, in some embodiments the UE may activate and begin using the bitmap information and the indication of the first quantity of beams upon reception in generating measurement information. However, in some embodiments, the UE will wait for reception of activation information before beginning to use the indication of the first quantity of beams and the bitmap information in generating measurement information. Thus, the base station may transmit the indication of the first quantity of beams and bitmap information to the UE in advance for storage by the UE and may transmit activation information to the UE to instruct the UE when to begin using the bitmap information and the indication of the first quantity of beams. In some embodiments, the base station may transmit the activation information in a same message as the indication of the first quantity of beams and the bitmap information to instruct the UE to begin generating measurement information using the bitmap information and the indication of the first quantity of beams upon reception.

At block 1110, the base station may receive a request for transmission of SSB blocks. Such a request may, for example, be the request described with respect to block 1008 of FIG. 10. The base station may receive such a request, for example, when the base station is configured to transmit SSB block burst transmissions in an aperiodic or semi-static configuration. In some embodiments, a request for transmission of SSB blocks may also include a request for a quantity of beams and bitmap information for the requested SSB blocks. In such embodiments, the base station may transmit and the UE may receive an indication of a quantity of beams and bitmap information in response to the request for transmission of SSB blocks.

At block 1112, the base station may transmit one or more SSB blocks in a first direction of a first beam. For example, the base station may transmit one or more SSB blocks of a first SSB block burst transmission indicated by a first bitmap of the bitmap information. In some embodiments, such transmission may be performed based on reception of a request for transmission of SSB blocks at block 1110.

At block 1114, the base station may transmit one or more SSB blocks in a second direction of a second beam. For example, the base station may transmit one or more SSB blocks of a first SSB block burst transmission or a second SSB block burst transmission indicated by a second bitmap of the bitmap information. In some embodiments, such transmission may be performed based on reception of a request for transmission of SSB blocks at block 1110. In some embodiments the one or more SSB blocks transmitted in the second direction of the second beam may be transmitted as part of a same SSB block burst transmission as the one or more SSB blocks transmitted in the first direction of the first beam described with respect to block 1112.

At block 1116, the base station may transmit a downlink transmission. The downlink transmission may, for example, be the downlink transmission described with respect to block 1010 of FIG. 10. The downlink transmission may, for example, be transmitted using a spatial filter corresponding to a transmit control information (TCI) state of a first reference SSB block transmitted by the base station at block 1112 or block 1114 and measured by the UE and received by the UE within a time period before reception of the downlink transmission by the UE. At block 1118, the base station may receive an uplink transmission. The uplink transmission may, for example, be the uplink transmission described with respect to block 1012 of FIG. 10. Thus, a base station may transmit an indication of a first quantity of beams and bitmap information to a UE for use by the UE in generating measurement information for SSB blocks transmitted by the base station to the UE.

Figure 12:
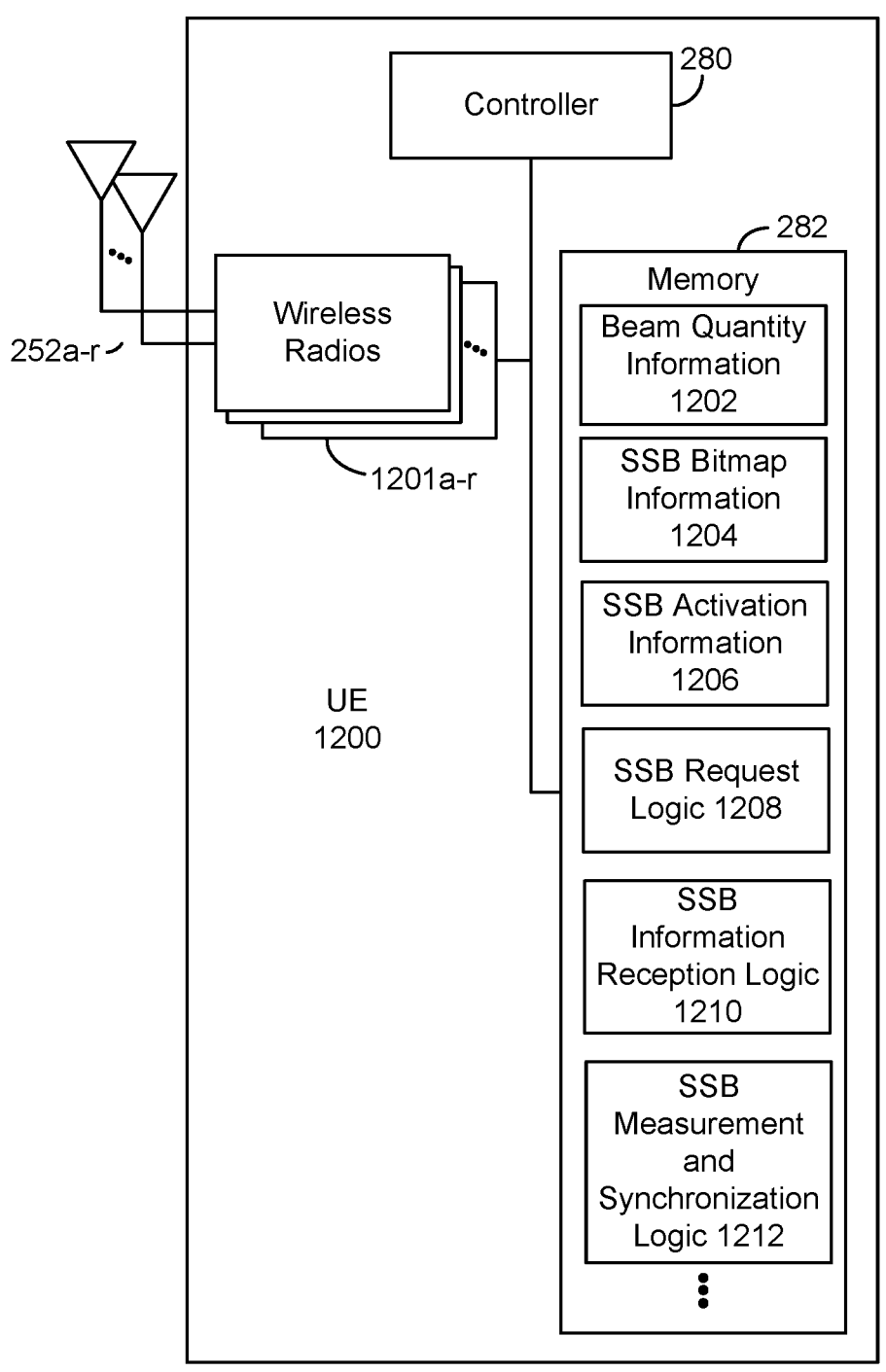
FIG. 12 is a block diagram of an example UE that supports synchronization signal pairing according to one or more aspects.

FIG. 12 is a block diagram of an example UE 1200 that supports pairing of synchronization signals for tracking and measurement to one or more aspects. UE 1200 may be configured to perform operations, including the blocks of a process described with reference to FIG. 10. In some implementations, UE 1200 includes the structure, hardware, and components shown and described with reference to UE 115 of FIGS. 1-3 and 4. For example, UE 1200 includes controller 280, which operates to execute logic or computer instructions stored in memory 282, as well as controlling the components of UE 1200 that provide the features and functionality of UE 1200. UE 1200, under control of controller 280, transmits and receives signals via wireless radios 1201*a-r* and antennas 252*a-r*. Wireless radios 1201*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include Beam quantity information 1202, SSB bitmap information 1204, SSB activation information 1206, SSB request logic 1206, SSB information reception logic 1210, and SSB measurement and synchronization logic 1212. Beam quantity information 1202 may include one or more quantities of beams used by a base station for transmission of SSB blocks in one or respective SSB block burst sets. SSB bitmap information 1204 may include one or more bitmaps corresponding to one or more of the quantity of beams of the Beam quantity information 1202. For example, SSB bitmap information may include multiple beam-specific bitmaps for a single beam, with each bitmap applying to a different SSB block burst transmission. SSB bitmap information 1204 may also include multiple respective beam-specific bitmaps for multiple respective beams of a single SSB block burst transmission. SSB activation information 1206 may include one or more indications of whether one or more bitmaps of the SSB bitmap information 1204 are activated. Instructions for activation of SSB bitmaps may, for example, be received from a base station. SSB request logic 1208 may be configured to transmit a request for transmission of one or more SSB blocks by a base station. Such a request may include a request for Beam quantity information or SSB bitmap information from a base station. SSB information reception logic 1210 may be configured to receive SSB information, such as Beam quantity information 1202, SSB bitmap information 1204, and SSB activation information 1206, from a base station. SSB measurement and synchronization logic 1212 may be configured to generate measurement information based on the SSB bitmap information 1204 or the SSB activation information and to perform synchronization with a base station based on the generated measurement information. UE 1200 may receive signals from or transmit signals to one or more network entities, such as base station 105 of FIGS. 1-2 and 4 or a base station as illustrated in FIG. 13.

Figure 13:
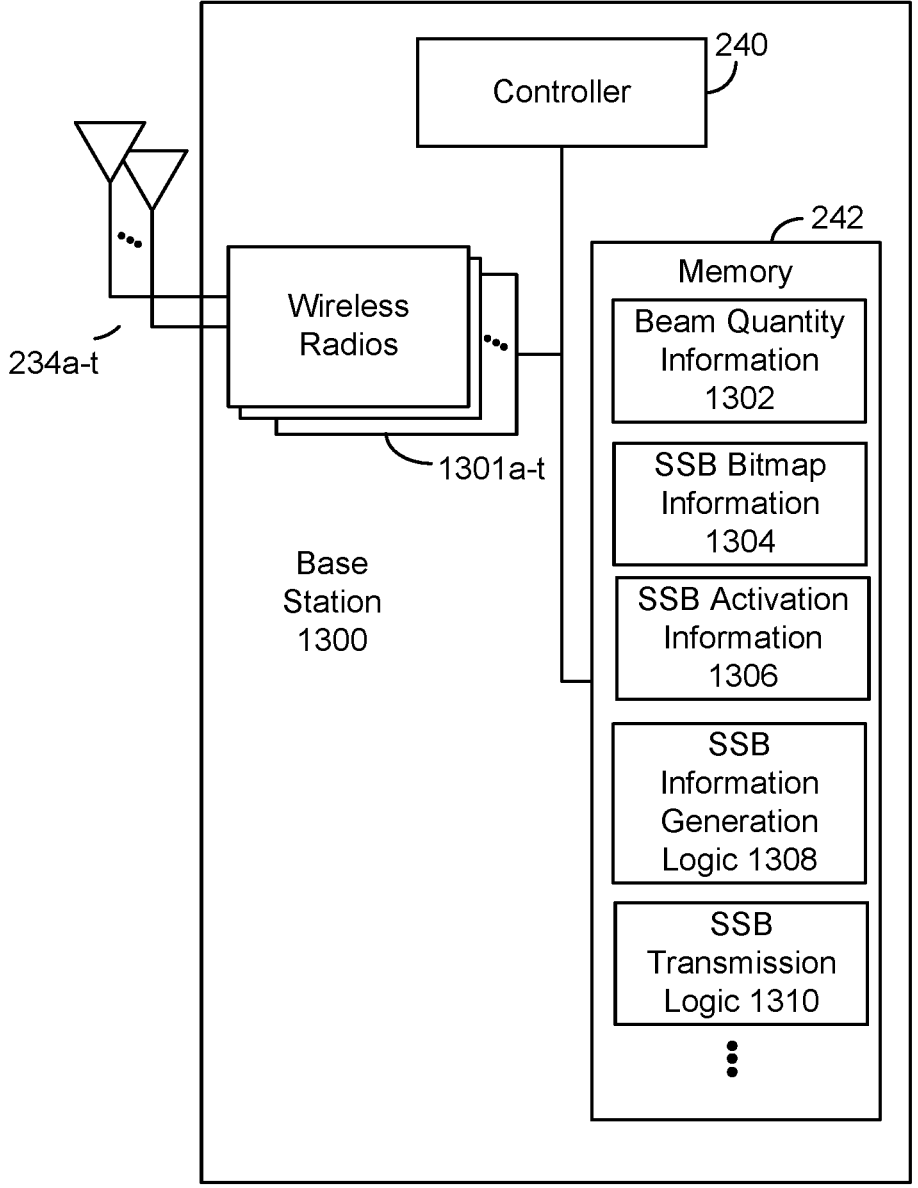
FIG. 13 is a block diagram of an example base station that supports synchronization signal pairing according to one or more aspects.

FIG. 13 is a block diagram of an example base station 1300 that supports pairing of synchronization signals for tracking and measurement according to one or more aspects. Base station 1300 may be configured to perform operations, including the blocks of process 1100 described with reference to FIG. 11. In some implementations, base station 1300 includes the structure, hardware, and components shown and described with reference to base station 105 of FIGS. 1-2 and 4. For example, base station 1300 may include controller 240, which operates to execute logic or computer instructions stored in memory 242, as well as controlling the components of base station 1300 that provide the features and functionality of base station 1300. Base station 1300, under control of controller 240, transmits and receives signals via wireless radios 1301*a-t* and antennas 234*a-t*. Wireless radios 1301*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include Beam quantity information 1302, SSB bitmap information 1304, SSB activation information 1306, SSB information generation logic 1308, and SSB transmission logic 1310. Beam quantity information 1302 may include one or more quantities of beams used by the base station for transmission of SSB blocks in one or respective SSB block burst sets. In some embodiments, the Beam quantity information 1302 may include Beam quantity information specific to all UEs connected to the base station 1300, specific to a group of UEs connected to the base station, or specific to a particular UE. SSB bitmap information 1304 may include one or more bitmaps corresponding to one or more of the quantity of beams of the beam quantity information 1302. For example, SSB bitmap information 1304 may include multiple beam-specific bitmaps for a single beam, with each bitmap applying to a different SSB block burst transmission. SSB bitmap information 1304 may also include multiple respective beam-specific bitmaps for multiple respective beams of a single SSB block burst transmissions. In some embodiments, the SSB bitmap information 1304 may include SSB bitmap information specific to all UEs connected to the base station 1300, specific to a group of UEs connected to the base station, or specific to a particular UE. SSB activation information 1306 may include one or more indications of whether one or more bitmaps of the SSB bitmap information 1304 are activated. Instructions for activation of SSB bitmaps may, for example, be transmitted by the base station 1300. In some embodiments, the SSB activation information 1306 may include SSB activation information 1306 specific to all UEs connected to the base station 1300, specific to a group of UEs connected to the base station 1300, or specific to a particular UE. SSB information generation logic 1308 may be configured to generate the Beam quantity information 1302, the SSB bitmap information 1304, and the SSB activation information 1306. SSB transmission logic 1310 may be configured to transmit the beam quantity information 1302, the SSB bitmap information 1304, the SSB activation information 1306, or one or more SSB blocks to one or more UEs. Base station 1300 may receive signals from or transmit signals to one or more UEs, such as UE 115 of FIGS. 1-3 and 4 or UE 1200 of FIG. 12.

Figure 10:
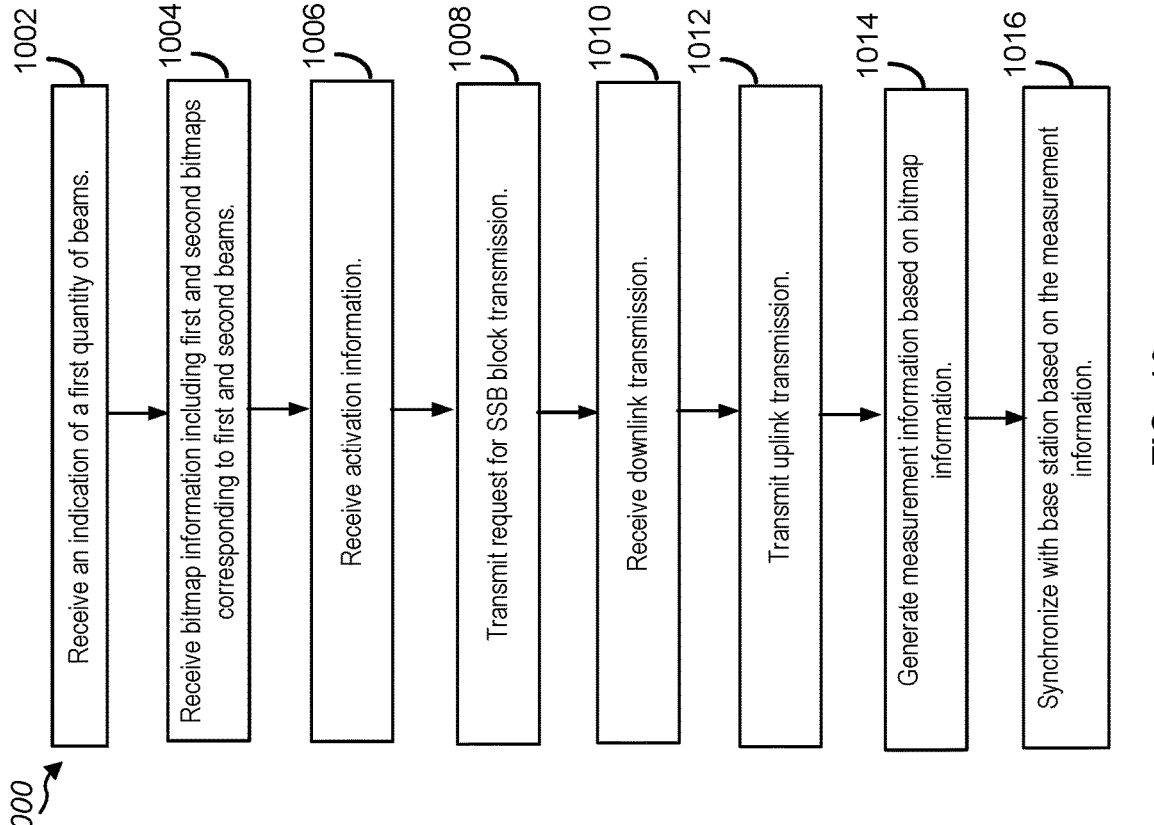
FIG. 10 is a flow chart diagram illustrating an example process that supports synchronization signal pairing according to one or more aspects.

It is noted that one or more blocks (or operations) described with reference to FIGS. 10-11 may be combined with one or more blocks (or operations) described with reference to another of the figures. For example, one or more blocks (or operations) of FIG. 10 may be combined with one or more blocks (or operations) of FIG. 11. As another example, one or more blocks associated with FIG. 10 may be combined with one or more blocks (or operations) associated with FIG. 1-3 or 4. Additionally, or alternatively, one or more operations described above with reference to FIG. 1-3 or 4 may be combined with one or more operations described with reference to FIG. 12 or 13.

In one or more aspects, techniques for supporting pairing of synchronization signals for tracking and measurement may include additional aspects, such as any single aspect or any combination of aspects described below or in connection with one or more other processes or devices described elsewhere herein. In a first aspect, supporting pairing of synchronization signals for tracking and measurement may include an apparatus configured to receive, from a second network node, an indication of a first quantity of beams, to receive, from the second network node, bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, and to generate first measurement information based on the bitmap information. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with one or more of the above aspects, the first set of SSB blocks and the second set of SSB blocks comprise cell-defining SSB (CD-SSB) blocks.

In a third aspect, alone or in combination with one or more of the above aspects, the first set of SSB blocks and the second set of SSB blocks comprise non-cell-defining SSB (NCD-SSB) blocks.

In a fourth aspect, alone or in combination with one or more of the above aspects, the apparatus may be configured to synchronize the first network node with the second network node based on the first measurement information.

In a fifth aspect, alone or in combination with one or more of the above aspects, the apparatus may be configured to synchronize the first network node with the second network node based on the first measurement information by determining a center frequency of a physical broadcast channel (PBCH).

In a sixth aspect, alone or in combination with one or more of the above aspects, the apparatus may be configured to generate first measurement information based on the bitmap information by generating first measurement information based on the first bitmap or the second bitmap.

In a seventh aspect, alone or in combination with one or more of the above aspects, the first direction of the first beam corresponds to a first transmission configuration indication (TCI) state of the first beam, and wherein the second direction of the second beam corresponds to a second TCI state of the second beam In a eighth aspect, alone or in combination with one or more of the above aspects, the first direction of the first beam corresponds to a first quasi-colocation (QCL) state of the first beam and the second direction of the second beam corresponds to a second quasi-colocation (QCL) state of the second beam.

In a ninth aspect, alone or in combination with one or more of the above aspects, the bitmap information comprises a first set of bitmaps indicating times for transmission of NCD-SSB blocks and a second set of bitmaps indicating times for transmission of CD-SSB blocks, and wherein the first set and the second set are different.

In a tenth aspect, alone or in combination with one or more of the above aspects, the bitmap information further comprises a third bitmap, and the third bitmap corresponds to the first beam and indicates a third set of times for transmission of a third set of SSB blocks by the second network node in the first direction of the first beam.

In an eleventh aspect, alone or in combination with one or more of the above aspects, the apparatus may be configured to receive, from the second network node, a downlink transmission transmitted in the first direction, wherein the first direction is a first direction of a first reference SSB block of the first set of SSB blocks, and wherein the first reference SSB block of the first set of SSB blocks is time division multiplexed with the downlink transmission, wherein the at least one processor is configured to receive the downlink transmission from the second network node within a time period from an end of reception of the first reference SSB block, and wherein the first measurement information includes first measurement information corresponding to the first reference SSB block.

In a twelfth aspect, alone or in combination with one or more of the above aspects, the time period is signaled to the first network node by the second network node.

In a thirteenth aspect, alone or in combination with one or more of the above aspects, the apparatus may be configured to transmit, to the second network node, an uplink transmission in the first direction, wherein the first direction is a first direction of a first reference SSB block of the first set of SSB blocks, wherein the first reference SSB block of the first set of SSB blocks is time division multiplexed with the uplink transmission, wherein the at least one processor is further configured to transmit the uplink transmission within a time period from an end of reception of the first reference SSB block, and wherein the first measurement information includes first measurement information corresponding to the first reference SSB block.

In a fourteenth aspect, alone or in combination with one or more of the above aspects, the apparatus may be configured to transmit the uplink transmission in the first direction by applying a spatial filter corresponding to a transmit control information (TCI) state of the first reference SSB block to the uplink transmission.

In a fifteenth aspect, alone or in combination with one or more of the above aspects, the apparatus may be configured to receive, from the second network node, information indicative of the time period.

In a sixteenth aspect, alone or in combination with one or more of the above aspects, the first bitmap and the second bitmap are cell-specific, group-specific, or network node-specific.

In a seventeenth aspect, alone or in combination with one or more of the above aspects, the apparatus may be configured to receive, from the second network node, activation information, wherein, to generate the first measurement information based on the bitmap information, the at least one processor is configured to generate, based on the activation information, the first measurement information based on the first bitmap.

In a eighteenth aspect, alone or in combination with one or more of the above aspects, the activation information comprises system information, radio resource control information, media access control control element (MAC CE) information, or downlink control information.

In a nineteenth aspect, alone or in combination with one or more of the above aspects, the first set of times is semi-static or aperiodic.

In a twentieth aspect, alone or in combination with one or more of the above aspects, the apparatus may be configured to transmit, to the second network node, a request for the second network node to transmit the first set of SSB blocks In a twenty-first aspect, alone or in combination with one or more of the above aspects, a first SSB block of the first set of SSB blocks comprises a primary synchronization signal (PSS), a physical broadcast channel (PBCH) and a secondary synchronization signal (SSS), and wherein the first measurement information corresponds to the SSS.

In a twenty-second aspect, alone or in combination with one or more of the above aspects, the apparatus may be configured to generate first measurement information based on the bitmap information by performing one or more measurements of the SSS and refrain from performing one or more measurements of the PSS or the PBCH.

In a twenty-third aspect, alone or in combination with one or more of the above aspects, the first bitmap further indicates a third set of times at which SSB blocks of the first set of SSB blocks will not be transmitted by the second network node in the first direction of the first beam.

In a twenty-fourth aspect, alone or in combination with one or more of the above aspects, the first bitmap further indicates that one or more times of the third set of times occur after a first time of the first set of times and before a second time of the first set of times.

In a twenty-fifth aspect, alone or in combination with one or more of the above aspects, the second bitmap further indicates a fourth set of times at which SSB blocks of the second set of SSB blocks will not be transmitted by the second network node in the second direction of the second beam, the second bitmap further indicates that each of the times of the fourth set of times occur either before both a third time of the second set of times and a fourth time of the second set of times or after the third time of the second set of times and the fourth time of the second set of times, and the first and second bitmaps further indicate that the first time of the first set of times and the third time of the second set of times are a same time In a twenty-sixth aspect, alone or in combination with one or more of the above aspects, the first bitmap further indicates that each of the times of the third set of times occur either before both a first time of the first set of times and a second time of the first set of times or after the first time of the first set of times and the second time of the first set of times.

In a twenty-seventh aspect, alone or in combination with one or more of the above aspects, the first and second bitmaps indicate that the first time of the first set of times and a third time of the second set of times are a same time.

In a twenty-eighth aspect, alone or in combination with one or more of the above aspects, the apparatus may be configured to generate second measurement information based on a default configuration when the indication of the first quantity of beams or the bitmap information is not received In one or more aspects, techniques for supporting pairing of synchronization signals for tracking and measurement may include additional aspects, such as any single aspect or any combination of aspects described below or in connection with one or more other processes or devices described elsewhere herein. In a twenty-ninth aspect, supporting pairing of synchronization signals for tracking and measurement may include an apparatus configured to generate an indication of a first quantity of beams, generate bitmap information, wherein the bitmap information includes a first bitmap and a second bitmap, wherein the first bitmap corresponds to a first beam of the first quantity of beams and indicates a first set of times for transmission of a first set of synchronization signal physical broadcast channel (SSB) blocks by the second network node in a first direction of the first beam, and wherein the second bitmap corresponds to a second beam of the first quantity of beams and indicates a second set of times for transmission of a second set of SSB blocks by the second network node in a second direction of the second beam, transmit, to the second network node, the indication of a first quantity of beams, transmit, to the second network node, the bitmap information, transmit one or more of the first set of SSB blocks in the first direction, and transmit one or more of the second set of SSB blocks in the second direction. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirtieth aspect, alone or in combination with one or more of the above aspects, the first set of SSB blocks and the second set of SSB blocks comprise cell-defining SSB (CD-SSB) blocks.

In a thirty-first aspect, alone or in combination with one or more of the above aspects, the first set of SSB blocks and the second set of SSB blocks comprise non-cell-defining SSB (NCD-SSB) blocks.

In a thirty-second aspect, alone or in combination with one or more of the above aspects, the first direction of the first beam corresponds to a first transmission configuration indication (TCI) state of the first beam, and wherein the second direction of the second beam corresponds to a second TCI state of the second beam.

In a thirty-third aspect, alone or in combination with one or more of the above aspects, the first direction of the first beam corresponds to a first quasi-colocation (QCL) state of the first beam and the second direction of the second beam corresponds to a second quasi-colocation (QCL) state of the second beam.

In a thirty-fourth aspect, alone or in combination with one or more of the above aspects, the bitmap information comprises a first set of bitmaps indicating times for transmission of NCD-SSB blocks and a second set of bitmaps indicating times for transmission of CD-SSB blocks, and wherein the first set and the second set are different.

In a thirty-fifth aspect, alone or in combination with one or more of the above aspects, the bitmap information further comprises a third bitmap, and wherein the third bitmap corresponds to the first beam and indicates a third set of times for transmission of a third set of SSB blocks by the second network node in the first direction of the first beam.

In a thirty-sixth aspect, alone or in combination with one or more of the above aspects, the apparatus may be configured to transmit, to the second network node, a downlink transmission in the first direction within a time period from an end of transmission of the first reference SSB block, wherein the first direction is a first direction of a first reference SSB block of the first set of SSB blocks, and wherein the first reference SSB block of the first set of SSB blocks is time division multiplexed with the downlink transmission, and wherein the downlink transmission is received by the second network node within a time period from an end of reception of the first reference SSB block by the second network node.

In a thirty-seventh aspect, alone or in combination with one or more of the above aspects, the apparatus may be configured to transmit, to the second network node, an indication of the time period.

In a thirty-eighth aspect, alone or in combination with one or more of the above aspects, the apparatus may be configured to transmit the downlink transmission in the first direction by applying a spatial filter corresponding to a transmit control information (TCI) state of the first reference SSB block to the downlink transmission.

In a thirty-ninth aspect, alone or in combination with one or more of the above aspects, the apparatus may be configured to receive, from the second network node, an uplink transmission transmitted in the first direction, wherein the first direction is a first direction of a first reference SSB block of the first set of SSB blocks, wherein the first reference SSB block of the first set of SSB blocks is time division multiplexed with the uplink transmission, and wherein the uplink transmission is transmitted by the second network node within a time period from an end of reception of the first reference SSB block by the second network node.

In a fortieth aspect, alone or in combination with one or more of the above aspects, the apparatus is configured to transmit, to the second network node, information indicative of the time period In a forty-first aspect, alone or in combination with one or more of the above aspects, the first bitmap and the second bitmap are cell-specific, group-specific, or network node-specific.

In a forty-second aspect, alone or in combination with one or more of the above aspects, the apparatus is configured to transmit, to the second network node, activation information, wherein the activation information comprises an instruction to generate first measurement information based on the bitmap information.

In a forty-third aspect, alone or in combination with one or more of the above aspects, the activation information comprises system information, radio resource control information, media access control control element (MAC CE) information, or downlink control information.

In a forty-fourth aspect, alone or in combination with one or more of the above aspects, the first set of times is semi-static or aperiodic.

In a forty-fifth aspect, alone or in combination with one or more of the above aspects, the apparatus may be configured to receive, from the second network node, a request for the first network node to transmit the first set of SSB blocks.

In a forty-sixth aspect, alone or in combination with one or more of the above aspects, a first SSB block of the first set of SSB blocks comprises a primary synchronization signal (PSS), a physical broadcast channel (PBCH) and a secondary synchronization signal (SSS).

In a forty-seventh aspect, alone or in combination with one or more of the above aspects, the first bitmap further indicates a third set of times at which SSB blocks of the first set of SSB blocks will not be transmitted by the second network node in the first direction of the first beam.

In a forty-eighth aspect, alone or in combination with one or more of the above aspects, the first bitmap further indicates that one or more times of the third set of times occur after a first time of the first set of times and before a second time of the first set of times.

In a forty-ninth aspect, alone or in combination with one or more of the above aspects, the second bitmap further indicates a fourth set of times at which SSB blocks of the second set of SSB blocks will not be transmitted by the second network node in the second direction of the second beam, wherein the second bitmap further indicates that each of the times of the fourth set of times occur either before both a third time of the second set of times and a fourth time of the second set of times or after the third time of the second set of times and the fourth time of the second set of times, and wherein the first and second bitmaps further indicate that the first time of the first set of times and the third time of the second set of times are a same time.

In a fiftieth aspect, alone or in combination with one or more of the above aspects, the first bitmap further indicates that each of the times of the third set of times occur either before both a first time of the first set of times and a second time of the first set of times or after the first time of the first set of times and the second time of the first set of times.

In a fifty-first aspect, alone or in combination with one or more of the above aspects, the first and second bitmaps indicate that the first time of the first set of times and a third time of the second set of times are a same time.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent. As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first network node comprising:
a memory; and
at least one processor coupled to the memory, wherein the at least one processor is configured to:
  receive, from a second network node, an indication of a first quantity of beams;
  receive, from the second network node, bitmap information, wherein the bitmap information includes a first bitmap and a second bitmap, wherein the first bitmap corresponds to a first beam of the first quantity of beams and indicates a first set of times for transmission of a first set of synchronization signal blocks (SSBs) by the second network node in a first direction of the first beam, and wherein the second bitmap corresponds to a second beam of the first quantity of beams and indicates a second set of times for transmission of a second set of SSBs by the second network node in a second direction of the second beam, wherein the bitmap information comprises a third bitmap, and wherein the third bitmap corresponds to the first beam and indicates a third set of times for transmission of a third set of SSBs by the second network node in the first direction of the first beam; and
  generate first measurement information based on the bitmap information.

2. The first network node of claim 1, wherein the at least one processor is further configured to:
  synchronize, based on a center frequency of a physical broadcast channel (PBCH), the first network node with the second network node based on the first measurement information.

3. The first network node of claim 1, wherein the first direction of the first beam corresponds to a first transmission configuration indication (TCI) state of the first beam or a first quasi-colocation (QCL) state of the first beam, and wherein the second direction of the second beam corresponds to a second TCI state of the second beam or a second QCL state of the second beam.

4. The first network node of claim 1, wherein the bitmap information comprises a first set of bitmaps indicating times for transmission of non-cell-defining SSBs and a second set of bitmaps indicating times for transmission of cell-defining SSBs, and wherein the first set of bitmaps and the second set of bitmaps are different.

5. The first network node of claim 1, wherein the at least one processor is further configured to:
  receive, from the second network node, a downlink transmission in the first direction, wherein the first direction corresponds to a first reference SSB of the first set of SSBs, and wherein the first reference SSB block is time division multiplexed with the downlink transmission, wherein the at least one processor is configured to receive the downlink transmission from the second network node within a time period from an end of reception of the first reference SSB, and
  wherein the first measurement information includes first measurement information corresponding to the first reference SSB.

6. The first network node of claim 1, wherein the at least one processor is further configured to:
  receive, from the second network node, activation information, wherein, to generate the first measurement information based on the bitmap information, the at least one processor is configured to generate, based on the activation information, the first measurement information based on the first bitmap,
  wherein the activation information comprises system information, radio resource control information, media access control control element (MAC CE) information, or downlink control information.

7. The first network node of claim 1, wherein the at least one processor is further configured to:
  transmit, to the second network node, a request for the second network node to transmit the first set of SSBs,
  wherein the first set of times is semi-static or aperiodic.

8. The first network node of claim 1, wherein a first SSB of the first set of SSBs comprises a primary synchronization signal (PSS), a physical broadcast channel (PBCH), and a secondary synchronization signal (SSS), wherein the first measurement information corresponds to the SSS, and wherein to generate the first measurement information based on the bitmap information, the at least one processor is configured to perform one or more measurements of the SSS and refrain from performing one or more measurements of the PSS or the PBCH.

9. A first network node comprising:
a memory; and
at least one processor coupled to the memory, wherein the at least one processor is configured to:
  receive, from a second network node, an indication of a first quantity of beams;
  receive, from the second network node, bitmap information, wherein the bitmap information includes a first bitmap and a second bitmap, wherein the first bitmap corresponds to a first beam of the first quantity of beams and indicates a first set of times for transmission of a first set of synchronization signal blocks (SSBs) by the second network node in a first direction of the first beam, and wherein the second bitmap corresponds to a second beam of the first quantity of beams and indicates a second set of times for transmission of a second set of SSBs by the second network node in a second direction of the second beam, wherein the first direction is a first direction of corresponds to a first reference SSB of the first set of SSBs;
  generate first measurement information based on the bitmap information; and
  transmit, to the second network node within a time period from an end of reception of the first reference SSB, an uplink transmission in the first direction, wherein the first reference SSB is time division multiplexed with the uplink transmission, and wherein the first measurement information includes measurement information corresponding to the first reference SSB.

10. A first network node comprising:
a memory; and at least one processor coupled to the memory, wherein the at least one processor is configured to:

generate an indication of a first quantity of beams;

generate bitmap information, wherein the bitmap information includes a first bitmap and a second bitmap, wherein the first bitmap corresponds to a first beam of the first quantity of beams and indicates a first set of times for transmission of a first set of synchronization signal blocks (SSBs) by a second network node in a first direction of the first beam, and wherein the second bitmap corresponds to a second beam of the first quantity of beams and indicates a second set of times for transmission of a second set of SSBs by the second network node in a second direction of the second beam, wherein the bitmap information comprises a first set of bitmaps indicating times for transmission of non-cell-defining SSBs and a second set of bitmaps indicating times for transmission of cell-defining SSBs, and wherein the first set of bitmaps and the second set of bitmaps are different;

transmit, to the second network node, the indication of a first quantity of beams;

transmit, to the second network node, the bitmap information;

transmit one or more of the first set of SSBs in the first direction; and transmit one or more of the second set of SSBs in the second direction.

11. The first network node of claim 10, wherein the first direction of the first beam corresponds to a first transmission configuration indication (TCI) state of the first beam or a first quasi-colocation (QCL) state of the first beam, and wherein the second direction of the second beam corresponds to a second TCI state of the second beam or a second QLC state of the second beam.

12. The first network node of claim 10, wherein the at least one processor is further configured to:

transmit, to the second network node, a downlink transmission in the first direction within a time period from an end of transmission of a first reference SSB of the first set of SSBs, wherein the first direction corresponds to the first reference SSB, and wherein the first reference SSB is time division multiplexed with the downlink transmission, and wherein the downlink transmission is received by the second network node within a time period from an end of reception of the first reference SSB by the second network node.

13. A first network node comprising:

a memory; and at least one processor coupled to the memory, wherein the at least one processor is configured to:

generate an indication of a first quantity of beams;

generate bitmap information, wherein the bitmap information includes a first bitmap and a second bitmap, wherein the first bitmap corresponds to a first beam of the first quantity of beams and indicates a first set of times for transmission of a first set of synchronization signal blocks (SSBs) by a second network node in a first direction of the first beam, and wherein the second bitmap corresponds to a second beam of the first quantity of beams and indicates a second set of times for transmission of a second set of SSBs by the second network node in a second direction of the second beam;

transmit, to the second network node, the indication of a first quantity of beams;

transmit, to the second network node, the bitmap information;

transmit one or more of the first set of SSBs in the first direction;

transmit one or more of the second set of SSBs in the second direction; and receive, from the second network node, an uplink transmission in the first direction, wherein the first direction corresponds to a first reference SSB of the first set of SSBs, wherein the first reference SSB is time division multiplexed with the uplink transmission, and wherein the uplink transmission is transmitted by the second network node within a time period from an end of reception of the first reference SSB by the second network node.

* * * * *